US012414195B2

(12) United States Patent
Vogedes et al.

(10) Patent No.: US 12,414,195 B2
(45) Date of Patent: Sep. 9, 2025

(54) eDRX ENHANCEMENT FOR REDUCED CAPABILITY DEVICE

(71) Applicant: IPLA HOLDINGS INC., New York, NY (US)

(72) Inventors: Jerome Vogedes, Wilmington, DE (US); Zhuo Chen, Wilmington, DE (US); Pascal Adjakple, Wilmington, DE (US); Joseph Murray, Wilmington, DE (US); Yifan Li, Wilmington, DE (US); Kyle Pan, Wilmington, DE (US); Rocco Di Girolamo, Wilmington, DE (US); Guodong Zhang, Wilmington, DE (US); Allan Tsai, Wilmington, DE (US); Mohamed Awadin, Wilmington, DE (US)

(73) Assignee: IPLA HOLDINGS INC., New York, NY (US)

( * ) Notice: Subject to any disclaimer, the term of this patent is extended or adjusted under 35 U.S.C. 154(b) by 399 days.

(21) Appl. No.: 17/927,016

(22) PCT Filed: Aug. 5, 2021

(86) PCT No.: PCT/US2021/044749
§ 371 (c)(1),
(2) Date: Nov. 22, 2022

(87) PCT Pub. No.: WO2022/031972
PCT Pub. Date: Feb. 10, 2022

(65) Prior Publication Data
US 2023/0199902 A1 Jun. 22, 2023

Related U.S. Application Data

(60) Provisional application No. 63/061,340, filed on Aug. 5, 2020.

(51) Int. Cl.
H04W 76/28 (2018.01)
H04W 52/02 (2009.01)
H04W 68/00 (2009.01)

(52) U.S. Cl.
CPC ....... H04W 76/28 (2018.02); H04W 52/0209 (2013.01); H04W 68/005 (2013.01)

(58) Field of Classification Search
CPC ............ H04W 76/28; H04W 52/0209; H04W 68/005
(Continued)

(56) References Cited

U.S. PATENT DOCUMENTS

2016/0212735 A1* 7/2016 Nogami ................ H04L 5/0048

FOREIGN PATENT DOCUMENTS

EP 3 412 113 B1 12/2018
WO WO-2011017912 A1 * 2/2011 ............... H04L 1/00
(Continued)

OTHER PUBLICATIONS

"3rd Generation Partnership Project;Technical Specification Group Services and System Aspects; Study on Cellular IoT support and evolution for the 5G System (Release 16)",3GPP Standard; Technical Report; 3GPP TR23.724, 3rd Generation Partnership Project(3GPP), Mobile Competence Centre ; 650, Route Des Lucioles ; F-06921 Sophia-Antipolis Cedex ; France,vol. SA WG2, No. Vi.1.0,Nov. 3, 2018 (Nov. 3, 2018), pp. 1-267,XP051487762.
(Continued)

Primary Examiner — Nghi H Ly
(74) Attorney, Agent, or Firm — XSENSUS LLP

(57) ABSTRACT

Methods, systems, and deices may assist in reducing the possibility that a reduced capability NR device misses a paging message due to the termination of PTW. Methods, systems, and devices may enable a UE to dynamically turn on and off eDRX mode of operation or change eDRX configuration based on its traffic profiles.

20 Claims, 24 Drawing Sheets

(58) Field of Classification Search
USPC .............. 455/458, 423, 418, 414.1, 422.1
See application file for complete search history.

(56) References Cited

FOREIGN PATENT DOCUMENTS

| WO | 2017/134561 A1 | 8/2017 |
|---|---|---|
| WO | 2020/068290 A1 | 4/2020 |
| WO | WO-2020067849 A | 4/2020 |

OTHER PUBLICATIONS

"3rd Generation Partnership Project; Technical Specification Group Services and System Aspects; System Architecture for the 5G System; Stage 2 (Release 16)",3GPP Standard; Technical Specification;3GPP TS 23.501, 3rd Generation Partnership Project (3GPP), Mobile Competence Centre ;650, Route Des Lucioles ; F-06921Sophia-Antipolis Cedex ; France,vol. SA WG2, No. Vi6.0.0,Mar. 28, 2019 (Mar. 28, 2019), pp. 1-318,XP051722957.
Huawei et al: "Solution for KI#4:Automatic Increasing eDRX Intervals",3GPP Draft; S2-188173 Solution for KI#4 Automatic Increasing EDRX Intervals, 3rd Generation Partnership Project (3GPP),Mobile Competence Centre ; 650, Route Deslucioles ; F-06921 Sophia-Antipolis CE/vol. Sa WG2, No. Sophia Antipolis, France;Aug. 20, 2018-Aug. 24, 2018 Aug. 14, 2018 (Aug. 14, 2018), XP051537105.
Intel Corporation: "Extended paging DRX for RedCap UEs",3GPP Draft; R2-2102852, 3rd Generation Partnership Project (3GPP), Mobile Competence Centre ; 650, Route Deslucioles ; F-06921 Sophia-Antipolis Cedex; France, vol. RAN WG2, No. Electronic meeting;Apr. 12, 2021-Apr. 20, 2021 Apr. 2, 2021 (Apr. 2, 2021), XP052174425.
International Search Report and Written Opinion mailed on Nov. 24, 2021, received for PCT Application PCT/US2021/044749, filed on Aug. 5, 2021, 12 pages.
Sony, "Battery lifetime enhancement for reduced capability NR devices through reduction of PDCCH monitoring", 3GPP TSG RAN WG1 #101, R1-2004194, May 25-Jun. 5, 2020, 5 pages.
ZTE Corporation et al., "CR on PDCCH monitoring occasions for paging", 3GPP TSG-RAN2 Meeting #103bis, R2-1815978, Oct. 8-12, 2018, 4 pages.
Ericsson, "Revised SID on Study on support of reduced capability NR devices", 3GPP TSG RAN Meeting #88e, RP-201386, Jun. 29-Jul. 3, 2020, 5 pages.

* cited by examiner eDRX ENHANCEMENT FOR REDUCED CAPABILITY DEVICE

CROSS-REFERENCE TO RELATED APPLICATIONS

This application is based on PCT filing PCT/US2021/044749, filed Aug. 5, 2021, which claims the benefit of U.S. Provisional Patent Application No. 63/061,340, filed on Aug. 5, 2020, entitled "eDRX ENHANCEMENT FOR REDUCED CAPABILITY DEVICE," the contents of each are hereby incorporated by reference herein.

BACKGROUND

Extended Discontinuous Reception (eDRX) is an extension of an existing LTE feature that can be used by IoT devices to reduce power consumption. eDRX can be used without PSM or in conjunction with PSM to obtain additional power savings.

This background information is provided to reveal information believed by the applicant to be of possible relevance. No admission is necessarily intended, nor should be construed, that any of the preceding information constitutes prior art.

SUMMARY

Disclosed herein are methods, systems, and devices that may assist in eDRX enhancement for reduced capability NR devices. In an example, methods may reduce the possibility that a reduced capability NR device misses a paging message due to the termination of PTW. Methods are disclosed for a UE to extend the length of its configured Paging Time Window implicitly without receiving an indication from gNB and explicitly after receiving an indication from gNB. A method is disclosed for a UE to use the max value of UE specific PTW length and cell specific PTW length as its PTW length, wherein the cell specific PTW is obtained from the gNB via system information and the UE specific PTW is obtained from, AMF when the UE registers in die network. A method is disclosed for a gNB to assist the Core Network to optimize the configuration of UE's PTW. In the disclosed method, the AMF obtains gNB assistance information. e.g., beam sweeping information, of which the UE connected to and decides the UE's PTW based on the beam sweeping information.

In addition, methods may enable a UE to dynamically turn on and off eDRX mode of operation or change eDRX configuration based on its traffic profiles. A method is disclosed that a UE sends a mobility registration update to re-negotiate the eDRX cycle when its traffic profile changes. A method is disclosed that gNB assists the UE to dynamically turn on and of T eDRX mode of operation or change eDRX configuration based on its traffic profiles.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Paging for NR

Figure 1:
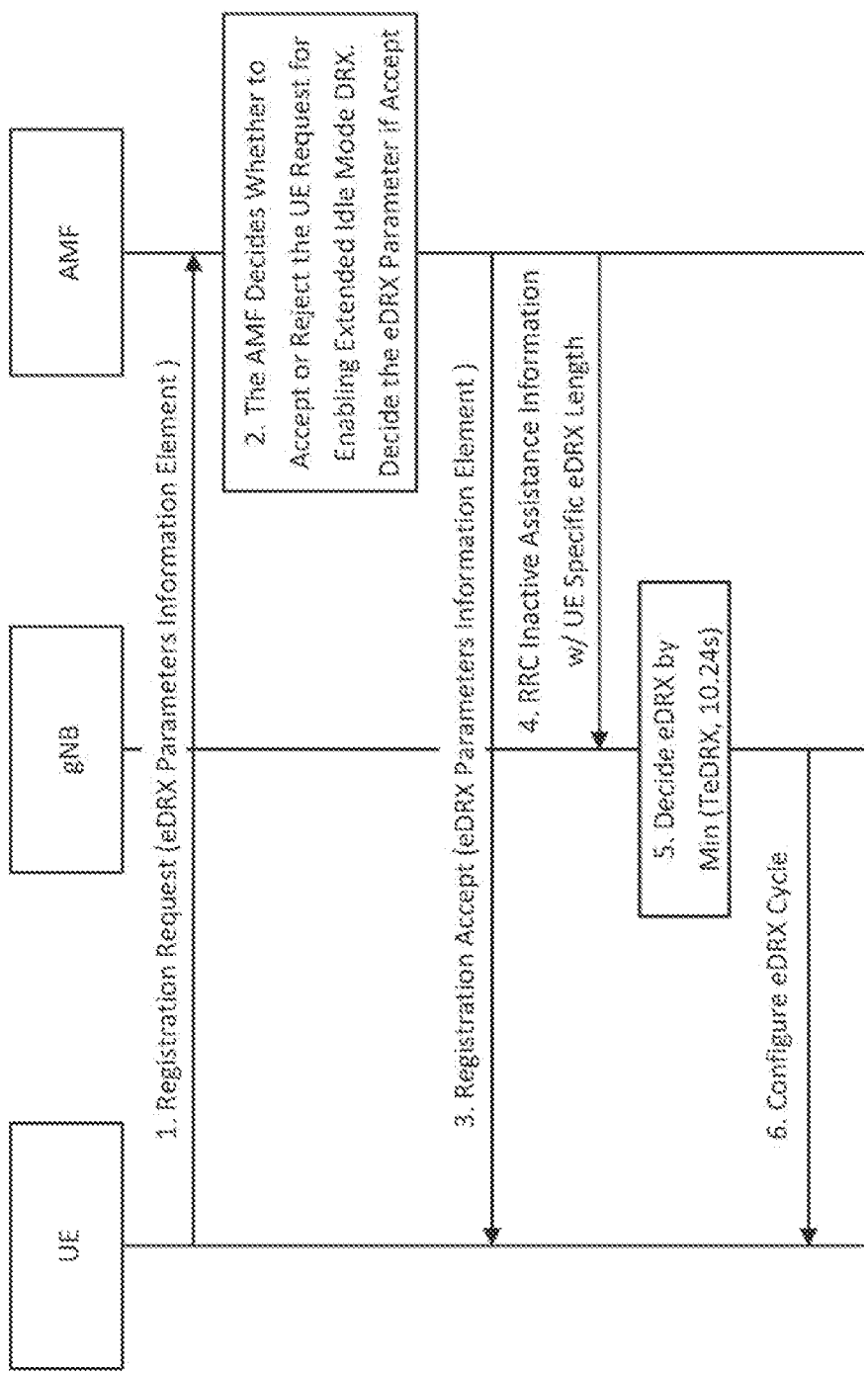
FIG. 1 illustrates an eDRX configuration procedure when a UE is in RRC_INACTIVE state.

Paging allows the network to reach UEs in RRC_IDLE and in RRC_INACTIVE state through Paging messages, and to notify UEs in RRC_IDLE, RRC_INACTIVE and RRC_CONNECTED state of system information change and ETWS/CMAS indications through Short Messages. Both Paging messages and Short Messages are addressed with P-RNTI on PDCCH but while the former is sent on PCCH, the latter is sent over PDCCH directly.

The UE may use Discontinuous Reception (DRX) in RRC_IDLE and RRC_INACTIVE state in order to reduce power consumption. The UE monitors one Paging Occasion (PO) per DRX cycle. A PO is a set of PDCCH monitoring occasions and can consist of multiple time slots (e.g., subframe or OFDM symbol) where the paging DCI can be sent, per TS 38.213 [5]. One Paging Frame (PF) is one Radio Frame and may contain one or multiple PO(s) or starting point of a PO.

In multi-beam operations, the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS The PF and PO for paging are determined by the following formulae: SFN for the PF is determined by:

(SFN+PF_offset)mod $T$=($T$ div $N$)*(UE_ID mod $N$)

Index (i_s), indicating the index of the PO is determined by.

$i\_s$=floor(UE_ID/$N$)mod $N_S$

The PDCCH monitoring occasions for paging are determined according to pagingSearchSpace as specified in TS 38.213 [5] and firstPDCCHMonitoringOccasionOfPO if configured as specified in TS 38.331 [2]. When SearchSpaceId=0 is configured for pagingSearchSpace, the PDCCH monitoring occasions for paging are same as for RMSI as defined in clause 13 in TS 38.213 [5].

When SearchSpaceId=0 is configured for paging-SearchSpace, $N_S$ is either 1 or 2. For $N_S$=1, there is only one PO which starts from the first PDCCH monitoring occasion for paging in the PF. For $N_S$=2. PO is either in the first half frame (i_s=0) or the second half frame (i_s=1) of the PF.

When SearchSpaceId other than 0 is configured for pagingSearchSpace, the UE monitors the $(i\_s+1)^{th}$ PO. A PO is a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The $[x*S+K]^{th}$ PDCCH monitoring occasion for paging in the PO corresponds to the $K^{th}$ transmitted SSB, where x=0, 1, . . . , X−1, K=1, 2, . . . , S. The PDCCH monitoring occasions for paging which do not overlap with UL symbols (determined according to tdd-UL-DL ConfigurationCommon) are sequentially numbered from zero starting from the first PDCCH monitoring occasion for paging in the PF. When firstPDCCH-monitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to i_s*S*X. If X>1 when the UE detects a PDCCH transmission addressed to P-RNTI within its PO, the UE is not required to monitor the subsequent PDCCH monitoring occasions for this PO.

NOTE 1. A PO associated with a PF may start in the PF or after the PF.

NOTE 2: The PDCCH monitoring occasions for a PO can span multiple radio frames. When SearchSpaceId other than 0 is configured for pagingSearchSpace the PDCCH monitoring occasions for a PO can span multiple periods of the paging search space.

The following parameters are used for the calculation of PF and i_s above:

T: DRX cycle of the UE (T is determined by the shortest of the UE specific DRX value(s), if configured by RRC and or upper layers, and a default DRX value broadcast in system information. In RRC_IDLE state, if UE specific DRX is not configured by upper layers, the default value is applied).

N: number of total paging frames in T $N_S$: number of paging occasions for a PF PF_offset: offset used for PF determination UE_ID: 5G-S-TMSI mod 1024

Parameters $N_S$, nAndPagingFrameOffset, nrofPDCCH-MonitoringOccasionPernSSB-InPO, and the length of default DRX Cycle are signaled in SIB1. The values of N and PF_offset are derived from the parameter nAndPagingFrameOffset as defined in TS 38.331 [2]. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas above.

5G-S-TMSI is a 48 bit long bit string as defined in TS 23.501 [6]. 5G-S-TMSI shall in the formulae above be interpreted as a binary number where the left most bit represents the most significant bit.

Extended DRX eDRX (Extended DRX) is a feature which was introduced b, 3GPP in Rel. 13. An enhancement of DRX was introduced to reduce power consumption of IoT devices. eDRX supports a longer DRX cycle than the legacy DRX. For example, in the RRC idle state the paging cycle is extended from 2.56 seconds to 44 minutes in LTE-M and 2.92 hours in NB-IoT.

The UE can request the use of idle eDRX during the initial attach procedure or tracking area update (TAU) by including the eDRX parameters IE. The network entity MME accepts the request from the UE by providing the eDRX parameters IE according to the network policy when accepting the attach or TA U procedure. The UE will then use the received eDRX parameters for the subsequent procedures. If the UE does not receive any eDRX values from the network, it effectively means that the network rejects the eDRX request, probably since the network does not have eDRX support. In that case, the eDRX parameter is not applied, and legacy DRX is used instead.

Starting with Rel. 13. 3GPP introduced a hyper system frame number (Hyper SFN or H-SFN) to extend the time span of the time parameters, e.g., the timer used for eDRX. One H-SFN consists of 1024 SFNs, and H-SFN rolls over to 0 after 1024 hyper frames (HF). This results in a maximum H-SFN duration of 29127 h (1024×10240 ms=10485769 ms=29.127 h). The introduction of H-SFN timing makes the longer paging cycle possible. The UE is reachable for paging in a paging hyperframe (PH), which is a specific set of H-SFN values. Within the PH, the UE monitors the PF and PO in the given Paging Time Window (PTW). PTW is the time period configured for a UE in the eDRX cycle during which the UE monitors paging occasions (PO) on the PDCCH. In the remaining cycle time, the UE does not monitor the PDCCH. Thus, the network considers the UE unreachable for paging until the next paging hyperframe (PH) comes along. A high-level summary or the PH, PF and PO calculation is explained as follows:

The PH is the H-SFN satisfying the following equation:

$$\text{H-SFN mod } T_{eDRX,H} = (\text{UE\_ID\_}H \text{ mod } T_{eDRX,H}),$$
where UE_ID_H:
- 10 most significant bits of the Hashed ID, if P-RNTI is monitored on PDCCH or MPDCCH
- 12 most significant bits of the Hashed ID, if P-RNTI is monitored on NPDCCH
- $T_{eDRX,H}$: eDRX cycle of the UE in Hyper-frames, ($T_{eDRX,H}=1, 2, \ldots, 256$ Hyper-frames)(for NB-IoT, $T_{eDRX,H}=2, \ldots, 1024$ Hyper-frames) and configured by upper layers PTW_start denotes the first radio frame of the PH that is part of the PTW and has SFN satisfying the following equation:

$$\text{SFN}=256*i_{eDRX}, \text{ where } i_{eDRX}=\text{floor}(\text{UE\_ID\_}H/T_{eDRX,H})\text{mod } 4$$

PTW_end is the last radio frame of the PTW and has SFN satisfying the following equation:

$$\text{SFN}=(\text{PTW\_start}+L*100-1)\text{mod } 1024, \text{ where}$$

L: Paging Time Window length (in seconds) configured by upper layers

For RAT types that support extended DRX for CM-CONNECTED with RRC Inactive state, the AMF passes the UE's accepted idle mode eDRX, cycle length value to NG-RAN. If the LE supports eDRX in RRC inactive, based on its UE radio capabilities. NG-RAN configures the UE with an eDRX cycle in RRC-INACTIVE up to the value for the UE's idle mode eDRX cycle as provided by the AMF in "RRC Inactive Assistance Information" or up to 10.24 seconds (whichever is lower). See FIG. 1.

Wake-Up-Signal

A wake-up signal (MIS) was introduced in 3GPP Rel. 15 and at first glimpse, it looks tike a repetition of the paging indicator channel introduced in 3GPP Rel. 99 (UMTS). With the paging indicator channel, the network sends physical layer information that indicates whether the UE should read die higher layer control information on the respective control channels. The advantage is that recognition of the paging indicator channel is based on a matched filter or correlation metric, a sort of low power receiver, and does not more energy consuming demodulation and decoding operations with the main baseband receiver. Without WUS, the UE would have to monitor the PDCCH for paging at each PO. With the WUS approach, the UE only needs to decode the PDCCH when WUS is detected, otherwise, the UE will stay in sleep mode.

WUS duration is the maximum time duration configured by the network for the UE to detect the WUS. The UE can expect WUS repetitions during "Configured maximum WUS duration" but the actual WUS transmission can be shorter, e.g., for UE in good coverage. After WUS is detected, the network leaves a time gap to allow the UE to resynchronize to the network and eventually switch from the low-power wake-up receiver to the main baseband circuitry in order to be ready to decode the PDCCH. If UE detects the WUS, the UE shall monitor the following N paging occasions (N=1 for non-extended DRX) unless it has received a paging message; For a UE configured with extended DRX, the WUS can be associated to one or multiple paging occasion(s) (N≥1) in a PTW; The paging operation in the CN (AMF/MME) is not aware of the use of the WUS in the RAN (gNB/eNB). See FIG. 2.

Support of Reduced Capability NR Devices

The use cases identified for 5G are Enhanced Mobile Broadband (eMBB). Massive Machine-Type Communication (mMTC) and Ultra-Reliable and Low Latency Communication (URLLC). Time Sensitive Communication (TSC) was also identified as a use case at the boundary between mMTC and URLLC.

Support for eMBB and URLLC were introduced in Release 15. URLLC was further enhanced in Release 16 with the enhanced URLLC (eURLLC) and Industrial IoT work items. Release 16 also introduced support for Time-Sensitive Networking (TSN) and 5G integration for TSC use cases. In the 3GPP study on "self-evaluation towards IMT-2020 submission" it was confirmed that NB IoT and LTE M fulfill the IMT-2020 requirements for mMTC and can be certified as 5G technologies.

In Release 17, a new set of use cases with requirements at the boundary of eMBB, URLLC and mMTC is being studied. These use cases include Industrial Wireless Sensor Networks (IWSN), smart cities and wearables.

IWSN use cases and requirements are described in TR 22.804 [7], TS 22.104 [8], TR 22.832[9] and TS 22.261 [0]. Devices in such an environment include e.g., pressure sensors, humidity sensors, thermometers, motion sensors, accelerometers, actuators, etc. Connecting these types of devices to 5G networks and core will allow connected industries to improve flexibility, enhance productivity and efficiency, reduce maintenance cost, and improve operational safety.

The smart duty use case and requirements are described in TS 22.804 [7]. The smart city vertical covers data collection and processing to more efficiently monitor and control city resources, and to provide services to city residents. Surveillance cameras are expected to be an essential part of a smart city.

The wearables use case includes smart watches, rings, eHealth related devices, and medical monitoring devices etc. Device supporting the wearables use case are expected to be small in size and may also be constrained in terms of power.

The Release 17 SID on Support of Reduced Capability NR Devices [11] defines generic requirements for these use cases as follows:

Device Complexity: Main motivation for the new device type is to lower the device cost and complexity as compared to high-end eMBB and URLLC devices of Rel-15/Rel-16. This is especially the case for industrial sensors.

Device Size: Requirement for most use cases is that the standard enables a device design with compact form factor.

Deployment Scenarios. System should support all FR1/FR2 bands for FDD and TDD.

The Release 17 SID on Support of Reduced Capability NR Devices [11] defines use case specific requirements as follows:

Industrial Wireless Sensors: Communication service availability is 99.99% and end-to-end latency less than 100 ms. The reference bit rate is less than 2 Mbps (potentially asymmetric e.g., heavy traffic) for all use cases and the device is stationary. The battery should last at least few years. For safety related sensors, latency requirement is lower, 5-10 ms.

Video Surveillance: The reference economic video bitrate would be 2-4 Mbps, latency <500 ms, reliability 99%-99.9%. High-end video e.g. for farming would require 7.5-25 Mbps. It is noted that traffic pattern is dominated by UL transmissions Wearables: Reference bitrate for smart wearable application can be 10-50 Mbps in DL and minimum 5 Mbps in UL, and peak bit rate of the device higher, 150 Mbps for downlink and 50 Mbps for uplink. Battery of the device should last multiple days (up to 1-2 weeks).

Issue Statement if #1: PTW Configuration and Optimization

In LTE DRX, a UC is expected to wake up for a specific sub-frame called the Paging Occasion (PO) to monitor the Physical Downlink Control Channel (PDCCH) for paging. In NR, due to the beam sweeping feature, a PO is a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The $[x*S+K]^{th}$ PDCCH monitoring occasion for paging in the PO corresponds to the $K^{th}$ transmitted SSB, where x=0, 1, . . . , X-1, K=1, 2, . . . , S, is a set of PDCCH monitoring occasions and can consist of multiple time slots (e.g., subframe or OFDM symbol) where paging DCI can be sent. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to i_s*S*X. Therefore, in multi-beam operations, a PO associated with a PF may start in the PF or after the PF. The PDCCH monitoring occasions for a PO can span multiple radio frames. When SearchSpaceId other than 0 is configured for paging-SearchSpace the PDCCH monitoring occasions for a PO can span multiple periods of the paging search space.

Figure 2:
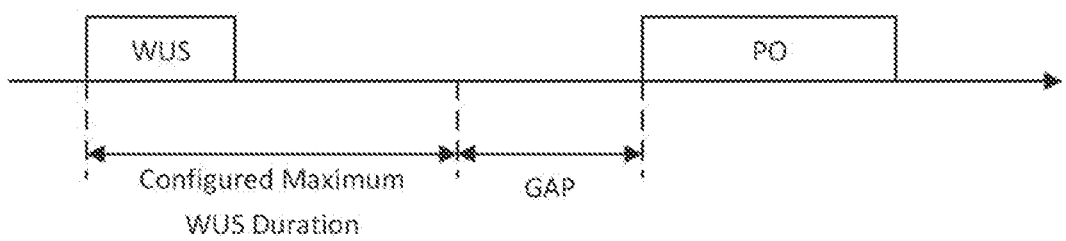
FIG. 2 illustrates a Wake-up-Signal.
Figure 3:
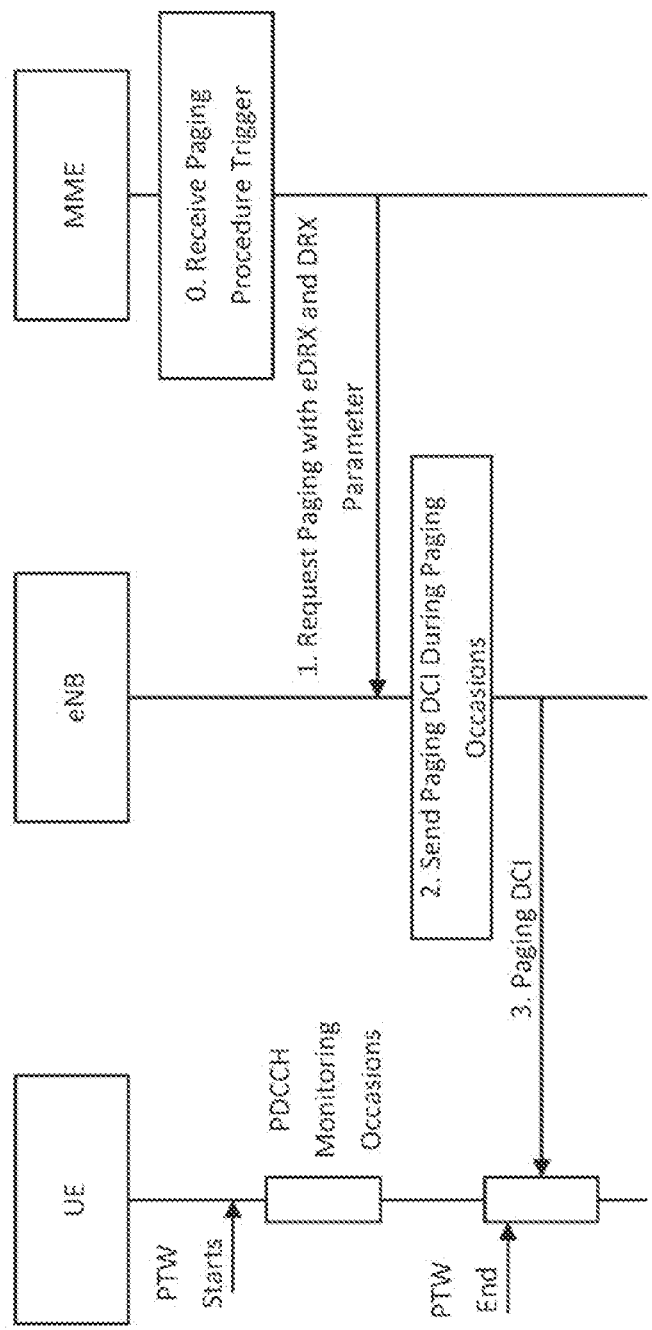
FIG. 3 illustrates a IE that missed the paging DC due to termination of PTW.

With reference to FIG. 3, in LTE eDRX. PTW_start denotes the first radio frame of the PH that is part of the PTW and PTW_end is the last radio frame of the PTW. The UE stop monitoring POs that are outside of PTW. The length of PTW is determined by the core network independent of RAN. However, there are several issues if NR reuses the same eDRX design as in LTE described in the conventional Wake-up-Signal section. In NR, the RAN determines the length of a PO by configuring the number of actual transmitted SSBs and the number of PDCCH Monitoring Occasions associated with an SSB. On the other hand, the length of PTW is configured by the core network independently. There is no coordination between RAN and the core network about the configuration of the PTW of a UE. Therefore, if a PTW of the UE is not configured properly, the PTW may end before the PO end and a UE cannot receive a Paging DCI. For example, as shown in FIG. 2, if a PO starts towards the end of PTW, the UE may miss the paging DCI due to termination of PTW. Once the paging is missed, the UE has to wait for the next eDRX cycle to receive the paging, which introduces at least it) seconds delay. Therefore, there is a need for a mechanism that reduce the possibility that a UE misses a paging message due to the termination of PTW.

Issue Statement #2: Power Saving for Different Traffic Profiles

In LTE, devices negotiate eDRX configuration as part of initial power up attach procedure or during Tracking Area Update (TAU) procedure and never in between. A reduced capability device cannot dynamically turn on and off eDRX mode of operation or change eDRX configuration based on its traffic profiles. In one example, the upper layer has traffic A and traffic B. The traffic A is not delay tolerant and the UE cannot be in eDRX mode when the traffic is active. The traffic B is delay tolerant and the UE can be in eDRX mode when all other traffics on the node is delay tolerant. When both traffic A and traffic B are active, the UE cannot be in the eDRX mode. However, when traffic A is terminated, the UE cannot switch into eDRX mode immediately since it has can only turn on or off eDRX during next periodic TAU. In another example, both traffic A and traffic B are delay tolerant but have different delay tolerant requirements. For example, traffic A can tolerant 30 seconds delay and traffic B can tolerant 30 minutes delay. When only traffic A is active, the UE can choose an eDRX cycle length T1 that is 20.48 seconds. When only traffic B is active, the UE can choose an eDRX cycle length T2 that is 1310.72 seconds. When traffic A and traffic B are both active, the eDRX cycle length should be set up to T1. However, when traffic A is terminated, the UE continues using the eDRX cede T1 until configured by the network donna the next TAU. This is power inefficient for the UE that only has traffic B is running since it has to wake up and monitoring a paging every 20.48 seconds. Therefore, there is a need for a mechanism that the eDRX parameter of UE can be configured dynamically.

Moreover, Commercial Mobile Alert System (CMAS), Earthquake and Tsunami Warning System (ETWS), and Public Warning System (PWS) delivery requirements (e.g., delay requirements) may not be met when a UE is in eDRX in LTE or NR. UEs that support CMAS and PWS cannot use eDRX with longer values. Therefore, it is power inefficient for RedCap (Reduced Capability) devices. e.g., wearables, which support CMAS and PWS.

Shorter values for the eDRX cycles, such as 236 seconds, have also been studied for RedCap device. For the lower bound of the eDRX cycle, one motivation to support shorter DRX cycles is that at least some RedCap UEs should be able to support the reception of emergency broadcast services (e.g CMAS, ETWS. PWS) within the required delay budget of 4 seconds while still achieving power saving. This requirement is not possible to be met with longer eDRX cycle lengths. Certain RedCap UEs may not be required to receive emergency alerts, e.g., CMAS, PWS. ETWS. Furthermore, some RedCap UEs are only required to receive these alerts periodically or when certain conditions or dynamic criteria for reception of these alerts apply. The network should have a method to identify these cases/devices and optimize power saving for these devices that need not receive the alerts.

If a RedCap UE is configured to use a shorter eDRX cycle such as 2.56 s for enabling broadcast emergency services (e.g., EWTS, CMAS, PWS), RedCap UEs do not need to monitor gNB configured default paging (and RAN paging) cycles which presents a potential risk of UE missing SI change indicator.

Disclosed Systems Associated with the Aforementioned Problems

Systems for Issue Statement #1

Paging Time Window Extension

Disclosed herein is a description of subject matter for a UE to extend the length of its configured Paging Time Window. In an example, a UE may extend its PTW implicitly without receiving an indication from gNB to extend its PTW. In another example, a UE may, extend its PTW explicitly after receiving an indication from gNB to extend its PTW.

Implicit Paging Time Window Extension

Figure 4:
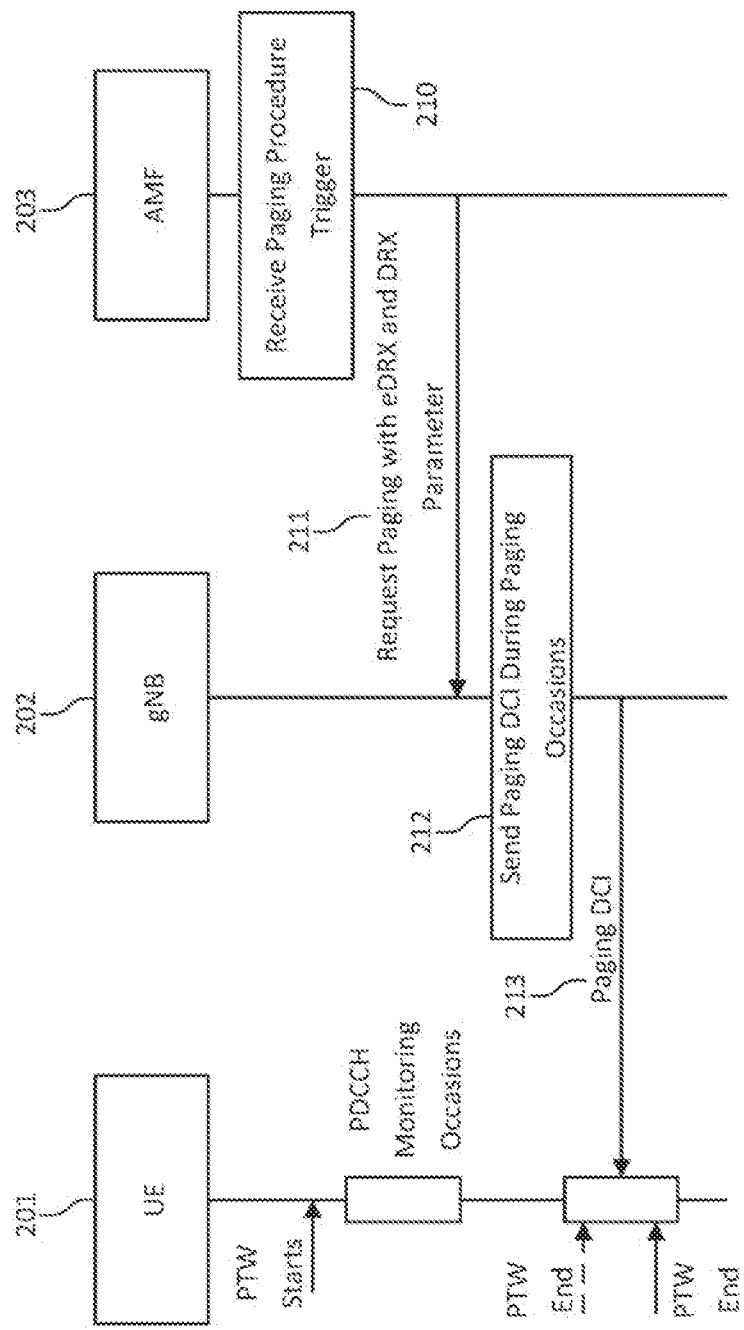
FIG. 4 illustrates Implicit Paging Time Window extension wherein the UE monitors an incomplete PDCCH monitoring occasion, for example the UE monitors a PDCCH monitoring occasion that overlaps with the PTW but not fully contained within the PTW.
Figure 5:
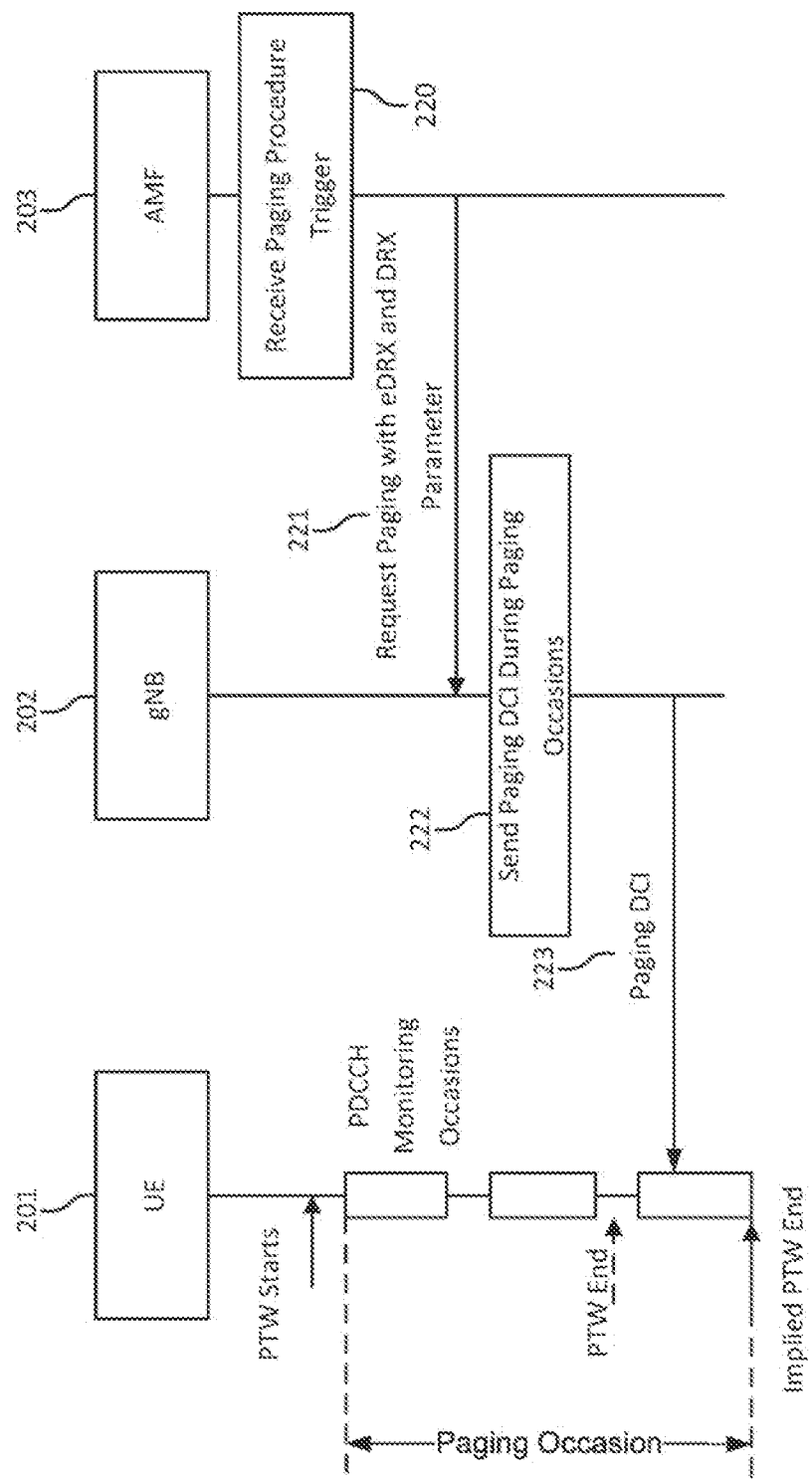
FIG. 5 illustrates Implicit Paging Time Window extension wherein the UE monitors a PDCCH monitoring occasion that is outside the PTW but belongs to a PO that overlaps with the PTW.

Disclosed herein is a description of subject matter for a UE 201 to extend its PTW implicitly without receiving an indication from gNB 202 to extend its PTW. In the first disclosed method in FIG. 4 that may include step 210 step 213, the UE 201 the UE monitors an incomplete PDCCH monitoring occasion, meaning the UE monitors a PDCCH monitoring occasion that overlaps with the PTW, but is not fully contained within the PTW. Additionally, in one embodiment, when a UE 201 is monitoring a PO, it may continue monitoring the PO beyond the PTW_end radio frame. In another embodiment, when the UE is monitoring a PDCCH monitoring occasion, it may continue monitoring the PDCCH monitoring occasion beyond the PTW_end radio frame. In yet another embodiment, a UE may not monitor an incomplete PDCCH monitoring occasion, i.e., the UE only monitors a complete PDCCH monitoring occasion, meaning a PDCCH monitoring occasion that is fully contained within the PTW. In another disclosed method in FIG. 5 that may include step 220-step 223, the UE monitors a PDCCH monitoring occasion that is outside the PTW but belongs to a PO that overlaps with the PTW. In one embodiment, the UE monitors all the PDCCH monitoring occasions outside PTW, that belongs to a PO that overlaps with the PTW. In another embodiment, the UE monitors only a predefined or preconfigured number of PDCCH monitoring occasions outside PTW, that belongs to a PO that overlaps with the PTW, for example the CAE may monitor only the first PDCCH monitoring occasion outside PTW, that belongs to a PO that overlaps with the PTW. In another embodiment, a UE may not monitor an incomplete PO, i.e., the UE only monitors a complete PO, meaning a PO that is fully contained with the PTW. Alternatively, the UE monitors PDCCH monitoring occasions until a page is received within the PO or until the PO ends. In yet another embodiment, when a UE 201 is not monitoring a PO at the end of PTW_end radio frame, a UE 201 may continue monitoring the next POs beyond the PTW_end radio frame if the PO is associated with a Paging Frame that overlaps with the PTW. For example, if PTW_end radio frame is a Paging Frame, and the PO does not start in the radio frame, the UE 201 continues monitoring the PO associated with the Paging Frame. In another example, if PTW_end radio frame is not a Paging frame and the PO associated with the previous Paging frame does not stark the UE continues monitoring the PO beyond the PTW_end radio frame. Furthermore, if at any point, the UE receives a page within the PO, the UE may stop monitoring additional PDCCH monitoring occasions, including prior to the PTW_end radio frame.

Explicit Paging Time Window Extension

Figure 6:
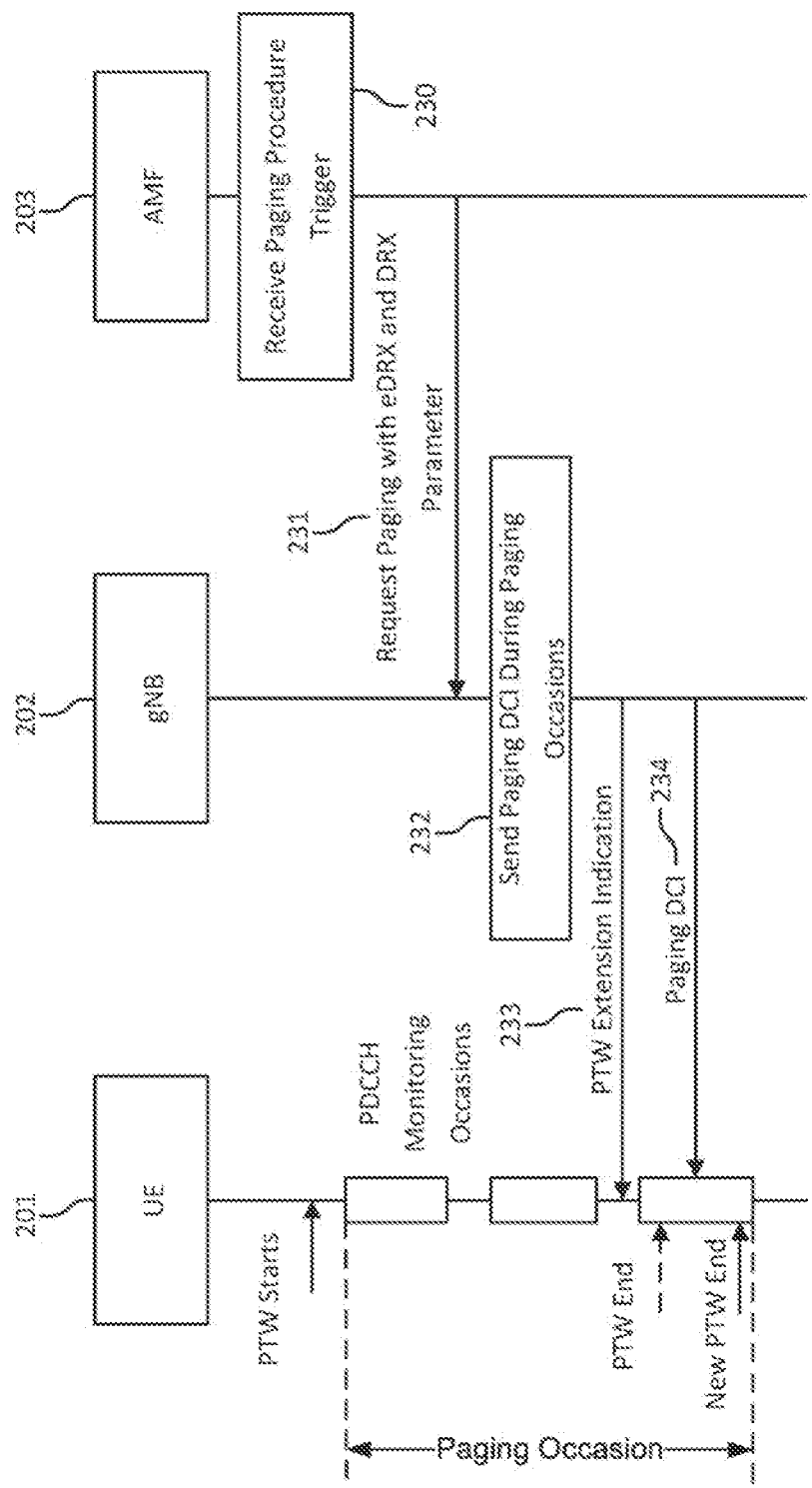
FIG. 6 illustrates Explicit Paging Time Window Extension.

Disclosed herein is a description of subject matter for a UE 201 to extend its PTW explicitly alter receiving an indication from gNB 202 to extend its PTW. In the disclosed method in FIG. 6 that may include step 230 step 234, gNB 202 sends a PTW extension indication at step 233 before sending a paging DCI at step 234. After receiving the PTW extension indication at step 233, a UE 201 continues monitoring the next n POs which may be beyond the PTW_end radio frame. n is Number of consecutive Paging Occasions (PO) mapped to one PTW extension indication provided in system information where (n≥1). Alternatively, the value of n can be indicated in the paging extension indication message. Alternatively, the value n can be configured via RRC configuration. The PTW extension indication can be sent to a device whose receiver and signal detection is based on a matched filter or simple correlator with low power consumption, a sort of low power receiver, and does not require high energy-consuming demodulation and decoding processing with the main high-complex baseband receiver. In one example, the PTW extension indication can be a Wake-Up-Signal (WUS). When UE 201 detects WUS, the UE 201 monitors the subsequent n POs which may be beyond the PTW_end radio frame or until a paging message including the t E's NAS identity is received, whichever is earlier. In another example, the PTW extension indication mac be a RS (e.g., DMRS, CSI-RS, TRS) or a pre-defined sequence.

PTW Configuration Optimization Using Cell Specified PTW

Figure 7:
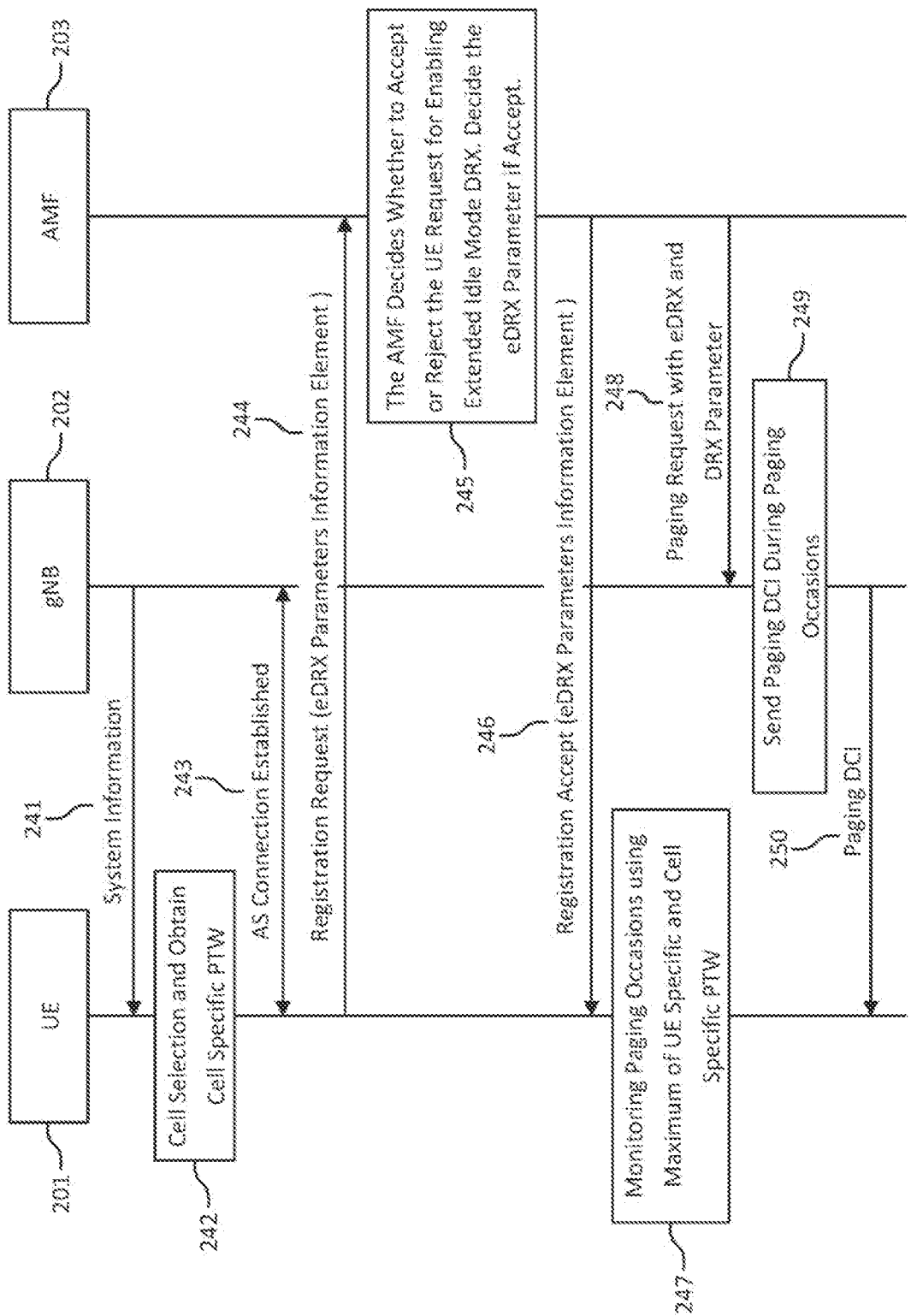
FIG. 7 illustrates PTW configuration optimization using cell specified PTW.

A method is disclosed to reduce the possibility that a UE 201 misses a paging message due to the termination of PTW. In this method as shown in FIG. 7 that may include step 241-step 250, the gNB 202 periodically broadcast in system information a cell specific PTW length which is determined by the gNB 202 based on the beam sweeping or SSB burst patterns. A UE 201 can obtain the cell specific PTW length in the system information. When a UE 201 registers in the network, it negotiates with the AMF 203 and obtains the UE specific PTW length determined by AMF 203. The UE 201 uses the max value of UE specific PTW length and cell specific PTW length as its PTW length. The detailed description of the method is as follows.

Step 241 of FIG. 7: gNB 202 periodically broadcasts the cell specific PTW length in the system information. In one example, the gNB 202 broadcast default PTW length in the PCCH-config in the DownlinkConfigCommonSIB information element. The PTW length value s1 corresponds to 1 unit which is 1.24 second, value s2 corresponds to 2 units which is 2.48 second and so on. See Table 1.

TABLE 1

```
DownlinkConfigCommonSIB ::= SEQUENCE {
    frequencyInfoDL        FrequencyInfoDL-SIB,
    initalDownlinkBWP      BWP-DownlinkCommon,
    bcch-Config            BCCH-Config,
    pcch-Config            PCCH-Config,
    ...
}
PCCH-Config ::=       SEQUENCE {
    defaultPagingCycle       PagingCycle
    defaultPTWLength         PTWLength
    nAndPagingFrameOffset    CHOICE {
       oneT           NULL,
       halfT          INTEGER (0..1),
       quarterT       INTEGER (0..3),
       oneEighthT     INTEGER (0..7),
       oneSixteenthT  INTEGER (0..15)
    },
    ns           ENUMERATED {four, two, one},
    firstPDCCH-MonitoringOccasionOfPO CHOICE {
       sCS15KHZoneT   SEQUENCE (SIZE (1..4)) OF INTEGER (0..139),
       sCS30KHZoneT-SCS15KHZhalfT            SEQUENCE (SIZE
(1..4)) OF INTEGER (0..279),
       sCS60KHZoneT-SCS30KHZhalfT-SCS15KHZquarterT
SEQUENCE (SIZE (1..4)) OF INTEGER (0..559),
       sCS120KHZoneT-SCS60KHZhalfT-SCS30KHZquarterT-
SCS15KHZoneEighthT
SEQUENCE (SIZE 1..4)) OF INTEGER (0..1119),
       sCS120KHZhalfT-SCS60KHZquarterT-SCS30KHZoneEighthT-
SCS15KHZoneSixteenthT SEQUENCE (SIZE (1..4)) OF INTEGER
(0..2239),
       sCS120KHZquarterT-SCS60KHZoneEightT-
SCS30KHZoneSixteenthT
SEQUENCE (SIZE (1..4) OF INTEGER (0..4479),
       sCS120KHZoneEighthT-SCS60KHZoneSixteenthT    SEQUENCE
(SIZE (1..4)) OF INTEGER (0..8959),
       sCS120KHZoneSixteenthT                  SEQUENCE (SIZE
(1..4)) OF INTEGER (0..17919)
    } OPTIONAL,   -- Need R
    ...
}
PTWLength::= ENUMERATED (s1, s2, s3, s4, s5, s6, s7, s8, s9, s10, s11,
s12, s13, s14, s15, s16, ...)
```

Step 242 of FIG. 7: After receiving the system information, the UE 201 obtains the cell specific PTW and selects the cell to establish AS connections.

Step 243 of FIG. 7: The UE 201 establishes an AS connection with the gNB 202.

Step 244 of FIG. 7: The UE 201 registers to the core network by sending a registration request to the AMF 203.

The registration process may include identification of the UE capabilities to determine whether or not the UE 201 is a RedCap UE and associated capabilities, requirements, and characteristics. In some embodiments, the RedCap capabilities or assistance may also include charging and energy characteristics. This may enable paging (re)configurations that are modified based on wireless power transfer and energy harvesting (e.g., RE charging, solar power), power dissipation or charging rates, and power level thresholds. Note that these energy/power methods may be variable and dynamic in nature, triggering paging configuration modifications to appropriately adapt power saving gains associated with e.g., longer eDRX cycles and shorter PTW or latency reductions with e.g., shorter DRX cycles and longer PTW. The registration request also includes the eDRX parameter information element for the UE 201 to enable eDRX. The eDRX parameter may include the cell specific PTW length of UE 201.

Step 245 of FIG. 7: The AMF 203 decides whether to accept or reject the request of UE 201 for enabling eDRX. The AMF 203 also decides if the eDRX parameter(s) are acceptable, partially acceptable, or not acceptable. Determination of whether to accept or reject the request may be based on a number of factors including, e.g., requirements for delivering emergency alerts, identified device type (RedCap. RedCap type, or non-Redcap, and UE power/energy characteristics), determined/calculated available paging capacity or traffic load of a network. Paging capacity can be directly impacted dependent upon duration of the configured paging timer windows.

Step 246 of FIG. 7. The AMF 203 sends a registration accept message to the UE 201. If the AMF 203 accepts the request of UE 201 for enabling eDRX, the message contains the eDRX parameter information element for the UE to use eDRX. The eDRX parameter contains the eDRX cycle and the PTW length.

Step 247 of FIG. 7: The UE 201 starts monitoring Paging Occasions using the maximum value of UE specific and cell specific PTW length.

Step 248 of FIG. 7: The AMF 203 sends a paging request with eDRX and DRX parameter to the gNB 202 which includes the Paging eDRX parameters including paging eDRX Cycle and UE specific PTW length.

Step 249 of FIG. 7: If UE specific PTW length is included in the paging request, the gNB 202 uses the maximum value of UE specific and cell specific PTW length to determine whether it should send a paging DCI in the next PO associated with the UE 201.

Step 250 of FIG. 7: The UE 201 receives a paging DCI—and then receives the paging message from the gNB 202.

Figure 8:
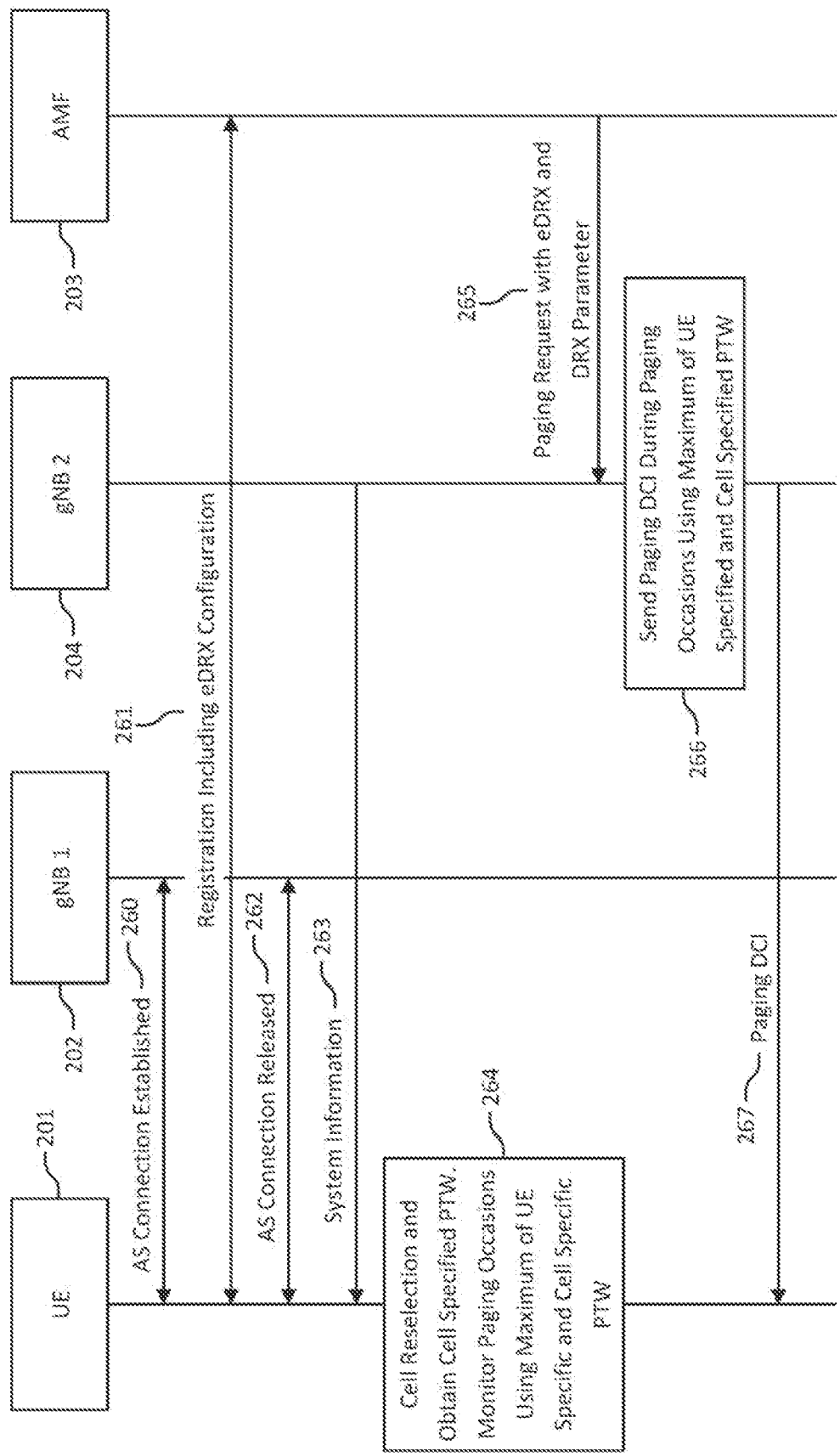
FIG. 8 illustrates PTW configuration optimization using cell specified PTW for UE mobility.

With regard to FIG. 8, when a UE 201 moves to another cell, the UE 201 can reselect the new cell and obtains the new cell specific PTW. FIG. 8 shows an example that a UE 201 moves to a new cell of gNB 204 from gNB 202 and obtains the new cell specific PTW. The detailed description of the method is as follows.

Step 260 of FIG. 8: The UE 201 establishes an AS connection with the gNB 202.

Step 261 of FIG. 8: The UE 201 registers to the core network configured eDRX parameter provided AMF 203. The registration process may include identification of the UE capabilities to determine w-Nether or not the UE 201 is a RedCap UE and associated capabilities, requirements, and characteristics.

Step 262 of FIG. 8: The UE 201 releases the AS connection with the gNB 202.

Step 263 and Step 264 of FIG. 8: The UE 201 moves to a new cell. The UE performs cell reselection on the new cell and obtains the new cell specified PTW as part of the system information from gNB 204. The UE 201 starts monitoring Paging Occasions using the maximum value of UE specific and cell specific PTW length.

Step 265 of FIG. 8: The AMF 203 sends a paging request with eDRX and DRX parameter to the gNB 204 which includes the Paging eDRX parameters including paging eDRX Cycle and UE specific PTW length.

Step 266 of FIG. 8: If UE specific PTW length is included in the paging request, the gNB 204 uses the maximum value of UE specific and cell specific PTW length to determine whether it should send paging DCI in the next PA associated with the UE 201.

Step 267 of FIG. 8: The UE 201 receives a paging DCI from gNB 204 and then receives the paging message from the gNB 204.

gNB Assisted NW Configuration Optimization

Methods are disclosed for a gNB 270 to assist the Core Network to configure UE's PTW to reduce the possibility that a UE 201 misses a paging message due to the termination of PTW. In the first disclosed method shown in FIG. 9 that may include step 270-step 275, after receiving the registration request from the UE 201, the AMF 203 sends a request to obtain gNB 202 assistance information, e.g., beam sweeping/SSB pattern of which the UE 201 is connected to. The AMF 203 decides the PTW based on the beam sweeping information. The detailed description of the method is as follows.

Figure 9:
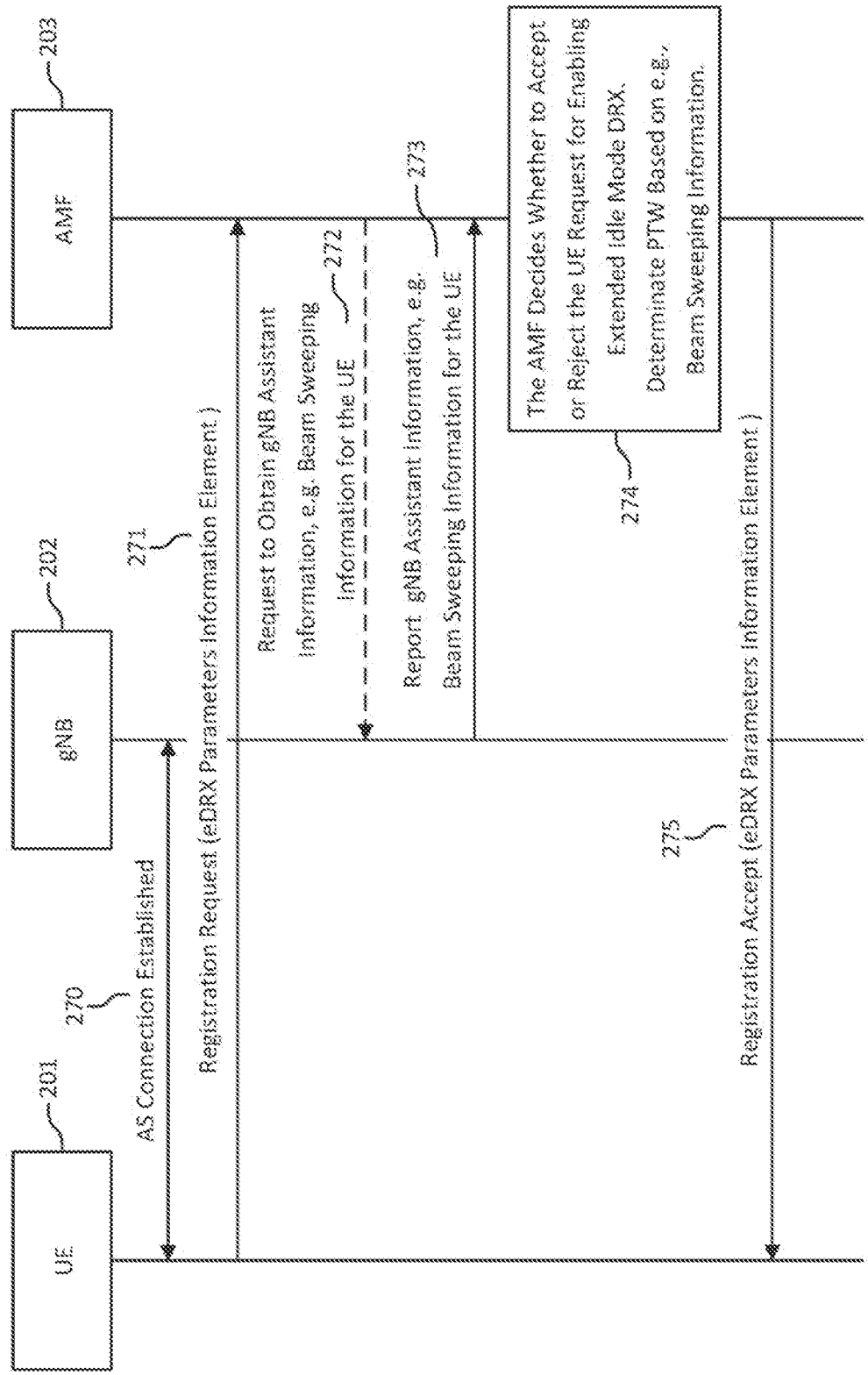
FIG. 9 illustrates gNB Assisted PTW configuration optimization.

Step 270 of FIG. 9: The UE 201 establishes an AS connection with the gNB 202.

Step 271 of FIG. 9: The UE 201 registers to the core network by sending a registration request to the AMF 203. The registration process may include identification of the UE capabilities to determine whether or not the UE 201 is a Redcap UE and associated capabilities, requirements, and characteristics (e.g., UE power/energy characteristics). The registration request also includes the eDRX parameter information element for the UE 201 to enable eDRX.

Step 272 of FIG. 9: The AMF 203 may send a request to the gNB 202 to obtain gNB 202 assistance information, e.g., beam sweeping information for the UE 201 if it does not know the beam sweeping information of the gNB 202. In one example, the AMF 203 requests to obtain the cell specific PTW of the gNB 202.

Step 273 of FIG. 9: The gNB 202 reports its gNB assistance information. e.g., beam sweeping information associated with the UE 201. In one example, the gNB 202 sends an NG SETUP REQUEST to the AMF 203 and includes the default PTW length it uses to send a paging DCI to the UE 201. In another embodiment, the gNB 202 sends a UE RADIO CAPABILITY INFO INDICATION to the AMF 203 and includes the supported PTW length it uses to send a paging DCI to the UE 201 in the UERadioCapabilityForPaging Information Element, which includes the RRC UERadioPagingInformation message as defined in [2]. See Table 2 and Table 3.

TABLE 2

```
-- NG SETUP REQUEST
--
-- ******************************************************************
NGSetupRequest ::= SEQUENCE {
    protocolIEs    ProtocolIE-Container    { {NGSetupRequestEs} },
    ...
}
NGSetupRequestIEs NGAP-PROTOCOL-IES ::= {
    { ID id-GlobalRANNodeID        CRITICALITY reject TYPE
GlobalRANNodeID        PRESENCE mandatory }|
    { ID id-RANNodeName            CRITICALITY ignore TYPE
RANNodeName            PRESENCE optional }|
    { ID id-SupportedTAList        CRITICALITY reject TYPE SupportedTAList
        PRESENCE mandatory }|
    { ID id-DefaultPagingDRX       CRITICALITY ignore TYPE PagingDRX
        PRESENCE mandatory }|
    { ID id-DefaultPTWLength       CRITICALITY ignore TYPE PTWLength
        PRESENCE mandatory }|
    { ID id-UERetentionInformation CRITICALITY ignore TYPE
UERetentionInformation PRESENCE optional }|
    { ID id-NB-IoT-Default@PagingDRX CRITICALITY ignore TYPE NB-IoT-
DefaultPagingDRX PRESENCE optional },
    ...
}
-- UE RADIO CAPABILITY INFO INDICATION
--
-- ******************************************************************
UERadioCapabilityInfoIndication ::= SEQUENCE {
    protocolIEs    ProtocolIE-Container    { {UERadioCapabilityInfoIndicationIEs} },
    ...
}
UERadioCapabilityInfoIndicationIEs NGAP-PROTOCOL-IES ::= {
    { ID id-AMF-UE-NGAP-ID         CRITICALITY reject TYPE AMF-UE-
NGAP-ID        PRESENCE mandatory }|
    { ID id-RAN-UE-NGAP-ID         CRITICALITY reject TYPE RAN-UB-
NGAP-ID        PRESENCE mandatory }|
    { ID id-UERadioCapability      CRITICALITY ignore TYPE UERadioCapability
        PRESENCE mandatory }|
    { ID id-UERadioCapabilityForPaging CRITICALITY ignore TYPE
UERadioCapabilityForPaging     PRESENCE optional     }|
    { ID id-UERadioCapability-EUTRA-Format CRITICALITY ignore TYPE
UERadioCapability     PRESENCE optional     },
    ...
}
```

TABLE 3

UERadioPagingInformation message

```
-- ASN1START
UERadioPagingInformation ::= SEQUENCE {
    criticalExtensions    CHOICE {
        c1              CHOICE
            ueRadioPagingInformation    UERadioPagingInformation-IEs,
            spare7 NULL,
            spare6 NULL, spare5 NULL, spare4 NULL,
            spare3 NULL, spare2 NULL, spare1 NULL
        },
        criticalExtensionsFuture    SEQUENCE { }
    }
}
UERadioPagingInformation-IEs ::= SEQUENCE {
    supportedBandListNRForPaging    SEQUENCE (SIZE (1..
maxBands)) OF FreqBandIndicatorNR
        OPTIONAL,
    supportedPTWForPaging    OCTET STRING
        OPTIONAL,
    nonCriticalExtension    SEQUENCE { }    OPTIONAL
}
-- ASN1STOP
```

Step 274 of FIG. 9: The AMF 203 decides whether to accept or reject the UE's request for enabling eDRX. The AMF 203 also determines PTW based on beam sweeping information, e.g., the cell specific PTW. Determination of whether to accept or reject the eDRX request may be based on a number of factors including. e.g., requirements for delivering emergency alerts, identified device type (RedCap, Redcap type, or non-RedCap, and UE power-energy characteristics), determined/calculated available paging capacity or traffic load of a network. Paging capacity can be directly impacted dependent upon duration of the configured paging timer windows.

Step 275 of FIG. 9: The AMF 203 sends a registration accept message to the UE 201. If the AMF 203 accepts the request of UE 201 for enabling eDRX, the message includes the eDRX parameter information element for the UE 201 to use eDRX. The eDRX parameter includes the eDRX cycle and the PTW length.

Figure 10:
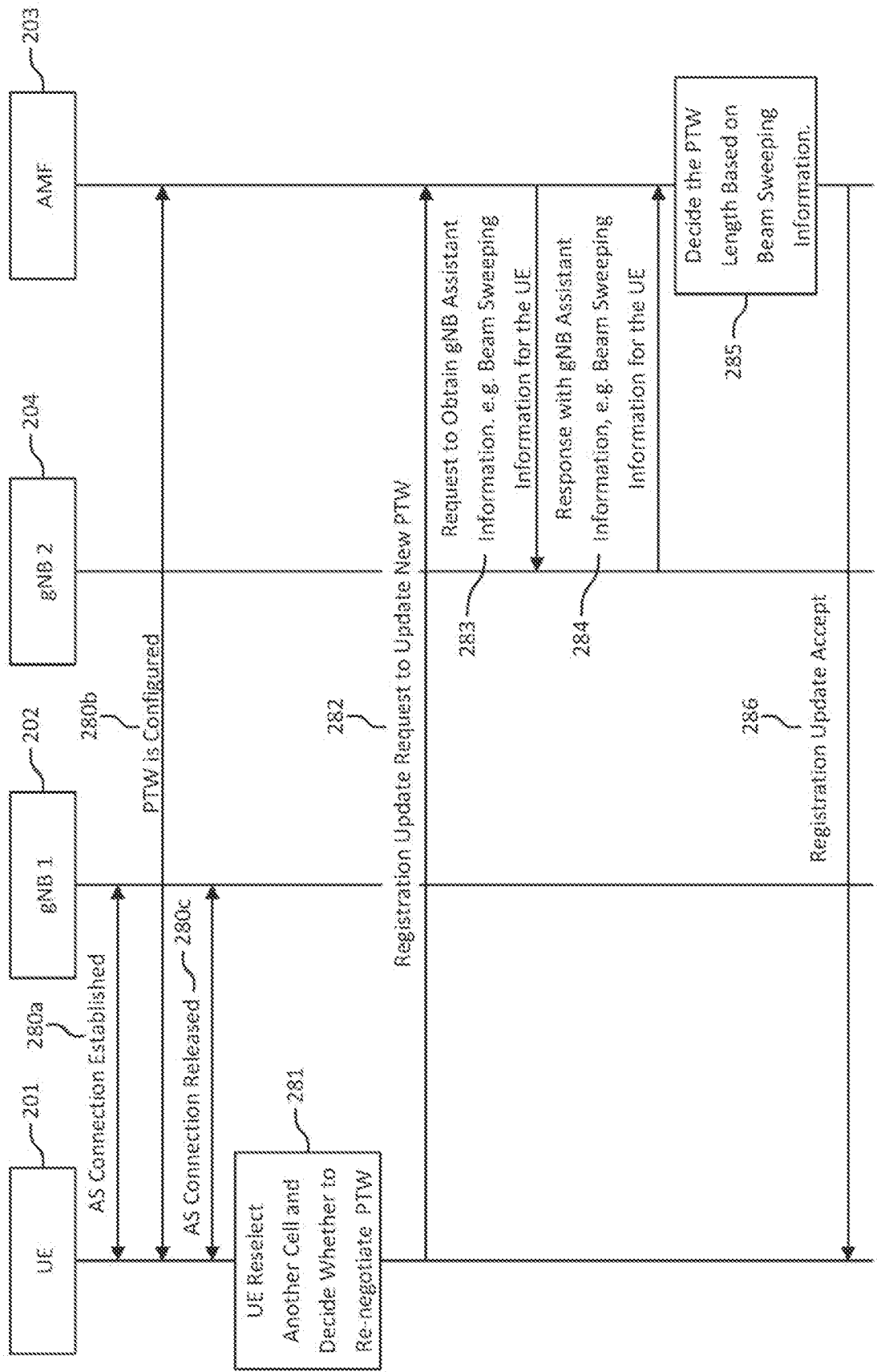
FIG. 10 illustrates gNB Assisted PTW configuration optimization using NAS message for UE mobility.

When a UE 201 moves to another cell, the UE 201 can reselect the new cell and needs to notify the core network about beam sweeping information of the new cell. FIG. 10 (step 280*a*-step 286) and FIG. 11 (step 290*a*-step 296) show examples of a UE 201 that moves to a new cell of gNB 204 from gNB 202 and re-negotiates the PTW. Re-negotiating the PTW requires the UE 201 to switch into RRC_Connected state, which consumes more power than RRC_Idle and RRC_Inactive states. Therefore, mechanisms are disclosed for a UE 201 to reduce the possibility of re-negotiating the PTW. In the first mechanism, a PTW validation area is disclosed which includes a group of cells that have the same or similar beam sweeping patterns. When a UE 201 is moving within a PTW validation area, the UE 201 does not need to re negotiate the PTW with the AMF 203. In one example, the core network provides the list of cells that is in the PTW validation area when UE 201 registers to the network. In another example, the serving gNB 202 of the UE 201 provides the list of cells that is in the PTW validation area when bringing the UE 201 to RRC inactive state. In yet another example, the serving gNB 202 of the UE 201 provides the list of cells that is in the PTW validation area when bringing the UE 201 to RRC idle state. In the second mechanism, the UE 201 compares the beam sweeping pattern of the new cell with the previous cell. In one example, the UE 201 compares the sub-PositionsInBurst in SIB1 nrofPDCCH-MonitoringOccasionPerSSB-InPO and firstPDCCH-MonitoringOccasionOfPO parameter of the previous cell. In another example, the UE 201 compares the cell specific PTW broadcasted by the new cell with the value of the previous cell. The UE 201 does not need to re-negotiate PTW if the new cell has the same beam sweeping patterns.

In the method described in FIG. 10, if the UE 201 decides to update its PTW, the UE 201 sends a NAS message to the AMF 203 to obtain the new PTW configuration. The detailed description of the method is as follows.

Step 280*a* of FIG. 10: The UE establishes an AS connection with the gNB 202.

Step 280*b* of FIG. 10: The UE registers to the core network configured eDRX parameter provided AMF 203. The registration process may include identification of the UE capabilities to determine whether or not the UE is a RedCap UE and associated capabilities, requirements, and characteristics. During the eDRX configuration, the AMF 203 may provide the list of cells that is in the PTW validation area when the UE 201 registers to the network.

Step 280*c* of FIG. 10: The UE releases the AS connection with the gNB 202. gNB 202 may provide the list of cells that is in the PTW validation area when bring the UE 201 to RRC inactive state.

Step 281 of FIG. 10: The UE 201 moves to a new cell of gNB 204. The UE 201 obtains the cell system information and reselects the new cell. Based on the system information, the UE 201 decides whether to re-negotiate the PTW. If the UE 201 decides to re-negotiate the PTW, it triggers the procedure in step 282.

Step 282 of FIG. 10: The UE sends a registration update request to the AMF.

Step 283 of FIG. 10. The AMF 203 sends a request to the gNB 204 to obtain gNB assistance information. e.g., beam sweeping information for the UE 201.

Step 284 of FIG. 10. The gNB 204 reports its gNB assistance information, e.g., beam sweeping information associated with the UE 201. In one example, the gNB 204 sends an NG SETUP REQUEST to the AMF 203 and includes the default PTW length it uses to send a paging DCI to the UE 201. In another example, the gNB 204 sends a UE RADIO CAPABILITY INFO INDICATION to the AMF 203 and includes the default PTW length it uses to send a paging DCI to the UE 201 in the UERadioCapabilityFor-PagingInformation Element.

Step 284: The AMF 203 determines a new PTW based on beam sweeping information, e.g., the cell specific PTW.

Step 285 of FIG. 10: The AMF 203 sends a registration update accept message to the UE 201 with the new PTW length.

In the method described in FIG. 1.1, if the UE 201 decides to update its PTW, the UE 201 sends an AS message to the gNB 204 to obtain the new PTW configuration. The detailed description of the method is as follows.

Figure 11:
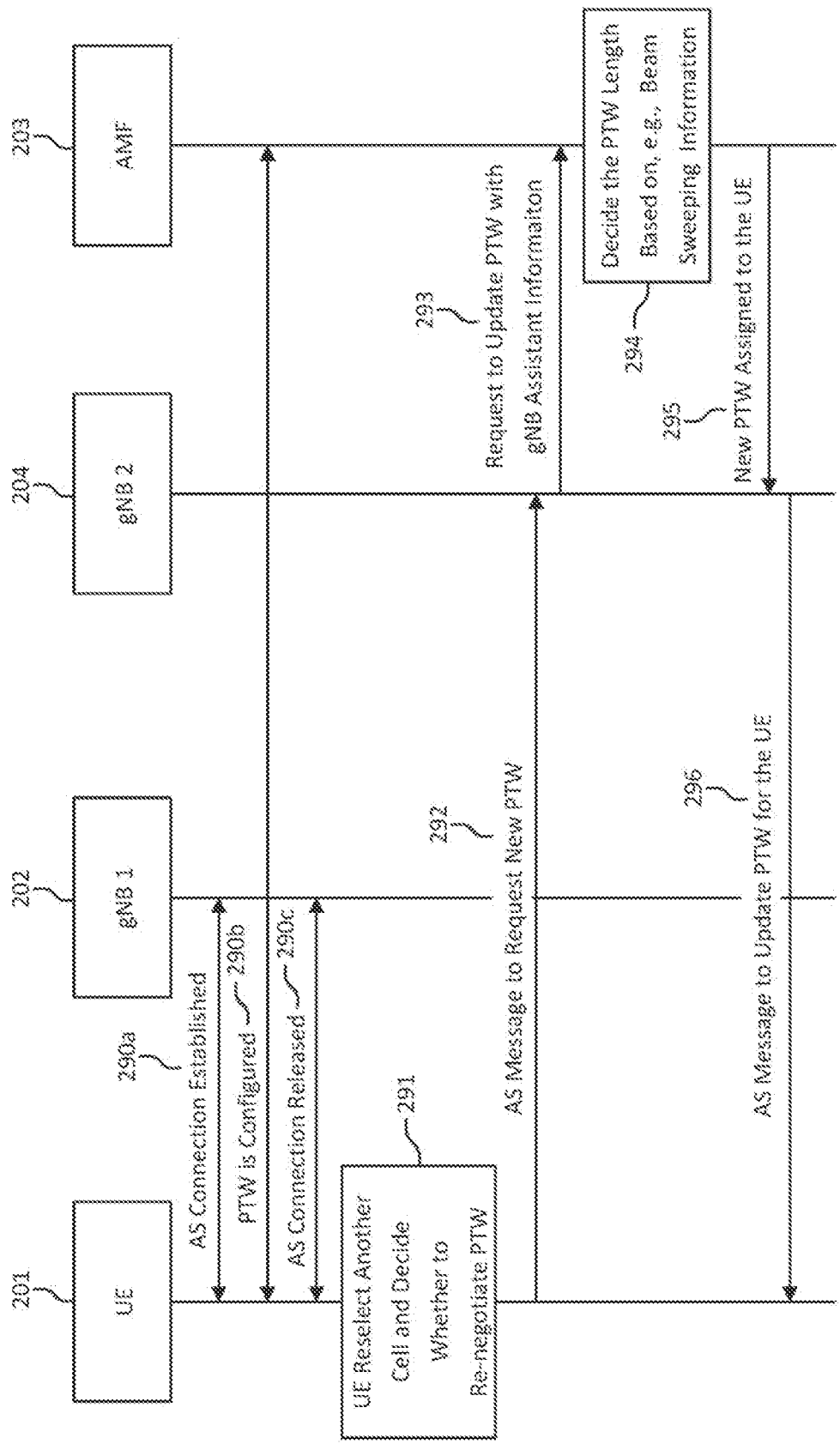
FIG. 11 illustrates gNB Assisted PTW configuration optimization using AS message for UE mobility.

Step 290*a* of FIG. 11: The UE 201 establishes an AS connection with the gNB 202.

Step 290*b* of FIG. 11: The UE 201 registers to the core network configured eDRX parameter provided AMF 203. The registration process may include identification of the UE capabilities to determine whether or not the GE 201 is a RedCap UE and associated capabilities, requirements, and characteristics. During the eDRX configuration, the AMF 203 may provide the list of cells that is in the PTW validation area when the UE 201 registers to the network.

Step 290*c* of FIG. 11. The UE 201 releases the AS connection with the gNB 202. gNB 202 may provide the list of cells that is in the PTW validation area when moving the UE 201 to RRC inactive state.

Step 291 of FIG. 11: The UE 201 moves to a net cell of gNB 204. The UE 201 obtains the cell system information and reselects the new cell. Based on the system information, the UE 201 decides whether to re-negotiate the PTW. If the UE 201 decides to re negotiate the PTW, it triggers the procedure in step 292.

Step 292 of FIG. 11: The UE 201 sends an AS message to the gNB 204 indicating it intends to re-negotiate the new PTW. The UE 201 may include its previous PTW length in the message.

Step 293 of FIG. 11: Based on the previous PTW length of UE 201, the gNB 204 may decide whether to update the PTW value of the UE 201. This decision may be further based on a number of factors including, e.g., requirements for delivering emergency alerts, identified device type or capabilities (RedCap, RedCap type, or non-Redcap, and UE power/energy characteristics), determined/calculated available paging capacity or traffic load of the gNB 204. Paging capacity can be directly impacted dependent upon duration of the configured paging timer windows. If the gNB 204 decides not to update the UE's PTW value, it sends the UE 201 to RRC_Idle or RRC_Inactive state. Otherwise, gNB 204 sends a request to the AMF 203 on behalf of the UE 201 to obtain a new PTW value. gNB 204 also reports its gNB assistance information, e.g., beam sweeping information associated with the UE 201 in one example, the gNB 204 sends an NO SETUP REQUEST to the AMF 203 and includes the default PTW length it uses to send a paging DCI to the UE 201. In another example, the gNB 204 sends a UE RADIO CAPABILITY INFO INDICATION to the AMF 203 and includes the default PTW length it uses to send a paging DCI to the UE 201 in the UERadioCapabilityFor-Paging Information Element.

Step 294 of FIG. 11: The AMF 203 determines a new PTW based on beam sweeping information, e.g., the cell specific PTW. The AMF 203 may also determine a new PTW based on additional factors including. e.g., requirements for delivering emergency alerts, identified device type or capabilities (RedCap, RedCap type, or non-RedCap, and UE power/energy characteristics), determined/calculated available paging capacity or traffic load of the network.

Step 295 of FIG. 11: The AMF 203 sends an RRC assistance information message to the gNB 204, which includes the new PTW length assigned to the UE 201.

Stem 296 of FIG. 11. The gNB 203 sends an AS message to the UE 201 with the newly assigned PTW length.

Systems for Issue Statement #2

The eDRX parameter of the UE 201 can be configured dynamically. In an example, UE 201 initiated methods are disclosed for a UE 201 to dynamically turn on and off eDRX mode of operation or change eDRX configuration. In another example, network initiated methods are disclosed to dynamically turn on and off eDRX mode of operation or change eDRX configuration of a UE 201.

UE Initiated Dynamic eDRX Configuration

Disclosed herein is a description of subject matter for a UE 201 to dynamically turn on and off eDRX mode of operation or change eDRX configuration. The UE 201 may request to change eDRX configurations based on its traffic profiles or triggered by its upper layer. In the first disclosed method in FIG. 12, the UE 201 may send a mobility registration update to re-negotiate the eDRX cycle when requesting to change eDRX configurations. The detailed description of the method is as follows.

Figure 12:
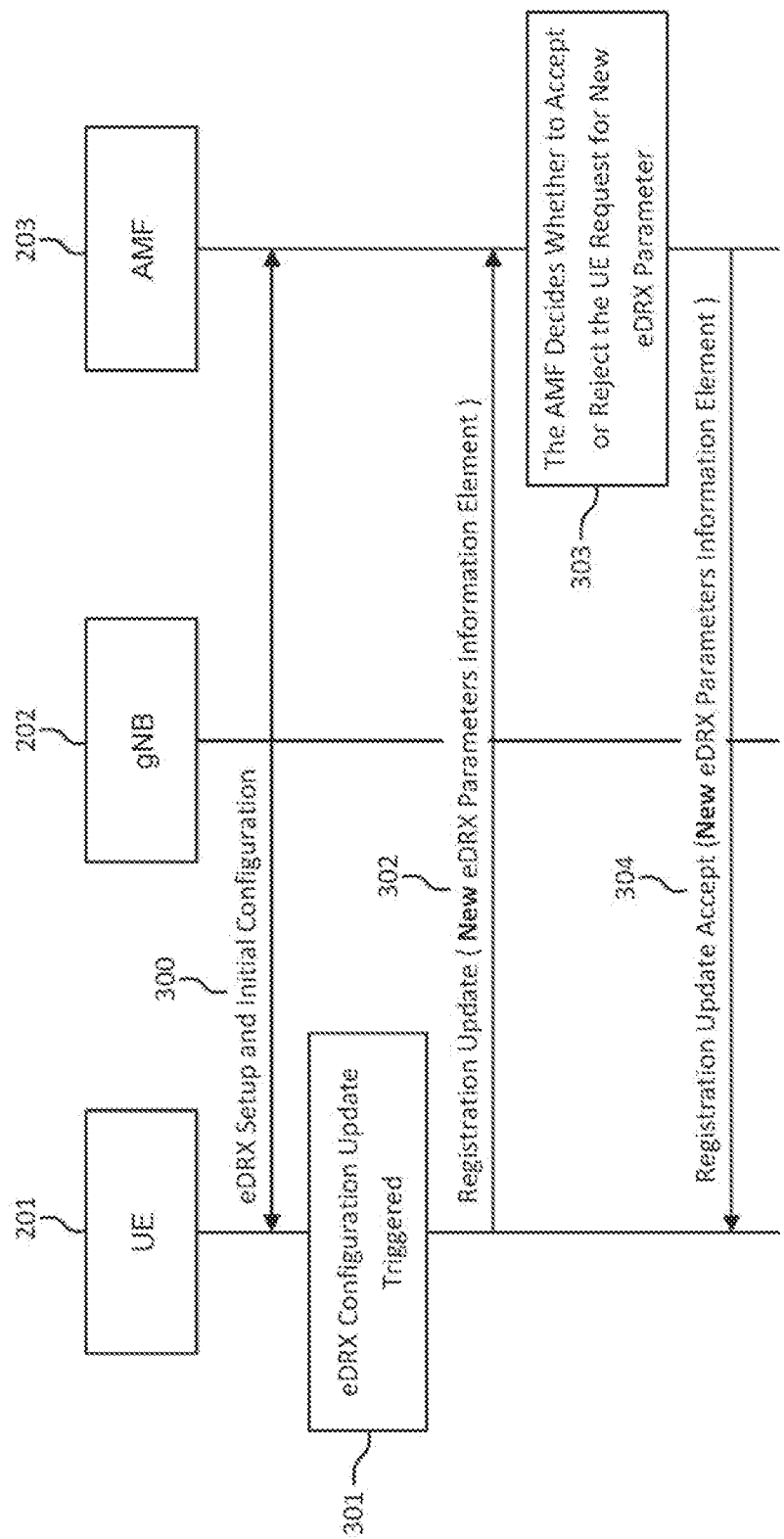
FIG. 12 illustrates Mobility registration update procedure to re-negotiate the eDRX cycle.

Step 300 of FIG. 12: The UE 201 registers to the Core Network and obtains the initial DRX configuration from AMF 203. The registration process may include identification of the UE capabilities to determine whether or not the UE 201 is a RedCap UE and associated capabilities, requirements, and characteristics. In one example, the UE 201 has an initial DRX configuration received from the AMF 203, and the UE 201 has both traffic A and traffic B that are delay tolerant but have different delay tolerant requirement. Traffic A can tolerant 30 seconds delay and traffic B can tolerant 30 minutes delay. When traffic A and traffic B are both active, the eDRX cycle length should be set up to 20.48 second in order to meet the delay requirement of Traffic A.

Step 301 of FIG. 12. An event is triggered to update eDRX configuration. For example, when the traffic profiles or energy/power characteristics on the UE 201 changes, the UE 201 decides whether to re-negotiate its eDRX parameters. e.g., eDRX cycle, with the core network. As an example, when traffic A is terminated and only traffic B is active, the UE 201 can choose an eDRX cycle length that is 1310.72 seconds dependent upon e.g., delay tolerant traffic requirements. The UE 201 sends a registration update request to the AMF 203 to re negotiate its eDRX cycle to reduce its power consumption in step 302. In an another example, when the charging or battery power level reaches a configured threshold, the UE 201 sends a registration update request to the AMF 203 to re-negotiate its eDRX cycle to either reduce its power consumption or decrease latency with a shorter eDRX cycle in step 302.

Step 302 of FIG. 12: The UE 201 sends a registration update request to the AMF 203 to re-negotiate its eDRX cycle. In the request, the UE 201 may include the disclosed new eDRX cycle, e.g., 1310.72 seconds in the eDRX parameters information elements.

Step 303 of FIG. 12: The AMF 203 decides whether to accept or reject the UE request for using the new eDRX parameter(s) and send a response to the UE 201. Determination of whether to accept or reject the request may be based on a number of factors including, e.g., requirements for delivering emergency alerts, identified device type or capabilities (RedCap, RedCap type, or non-RedCap and UE power/energy characteristics), determined/calculated available paging capacity or traffic load of a network. Paging capacity can be directly impacted dependent upon duration of the configured paging timer windows.

Step 304 of FIG. 12. The AMF 203 sends a registration update accept message with the new eDRX parameter to the UE 201. The UE 201 uses the new eDRX cycle to monitor Paging Occasions.

Figure 13:
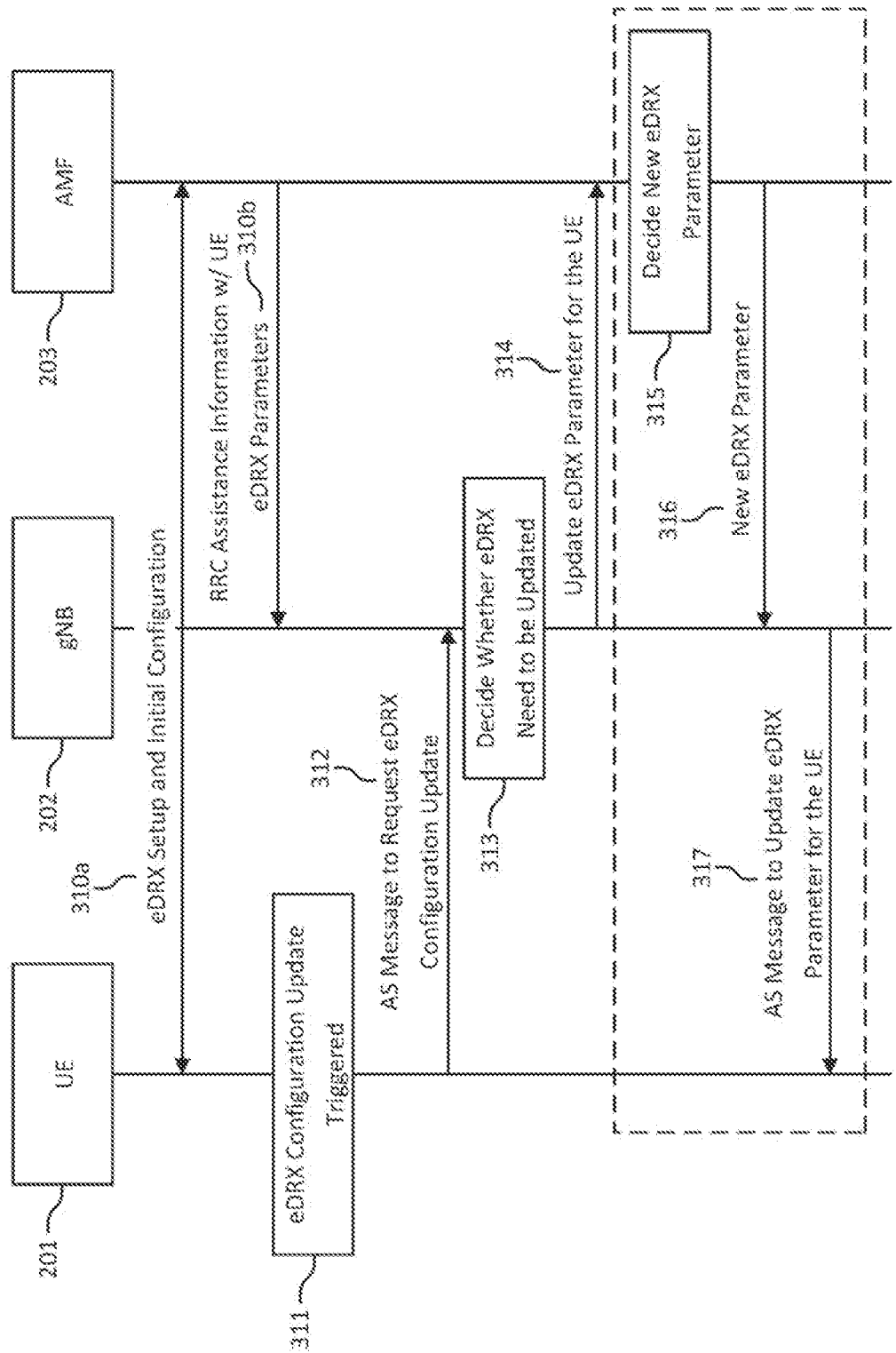
FIG. 13 illustrates eNB assisted eDRX cycle re-configuration when a UE's traffic profile changed and in RRC_IDLE.
Figure 14:
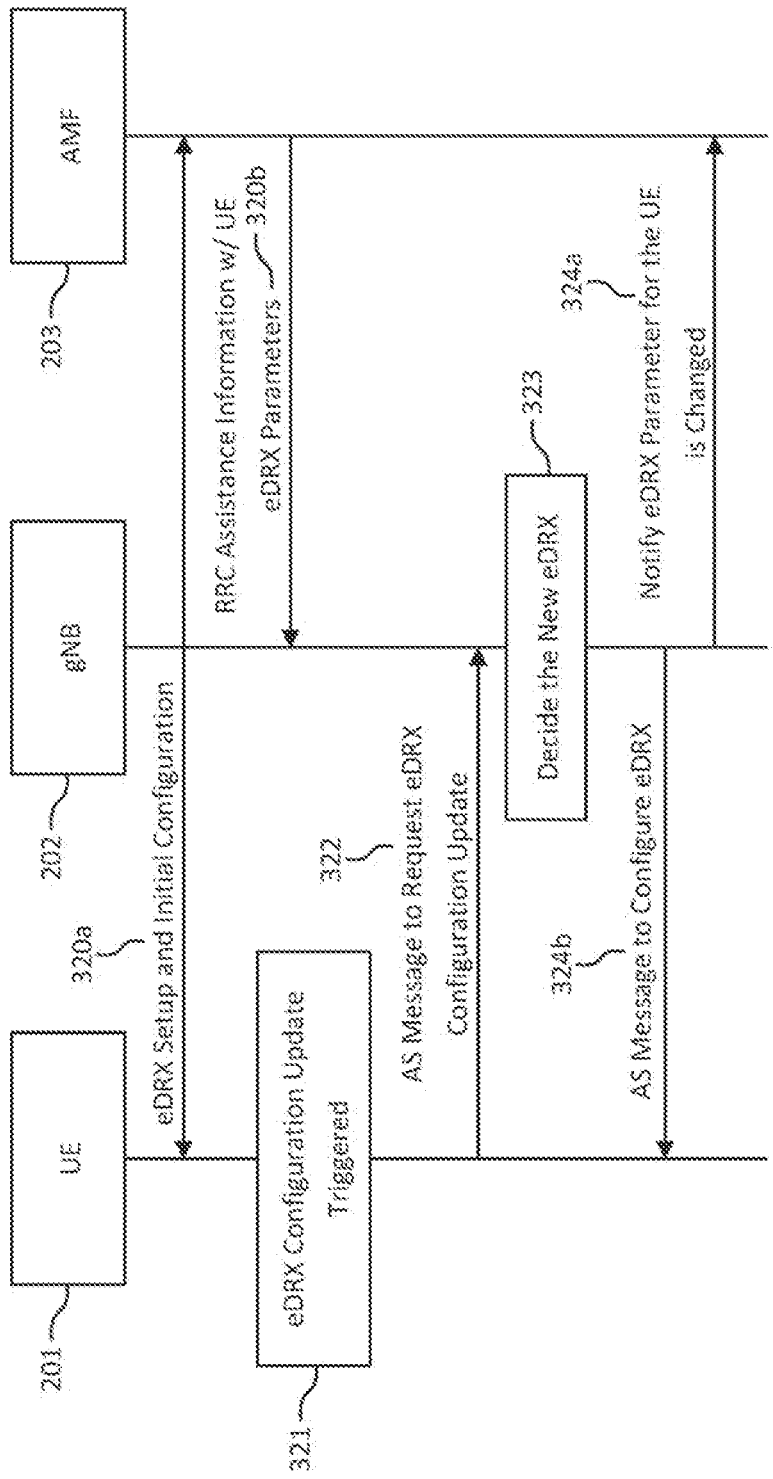
FIG. 14 illustrates gNB assisted eDRX cycle re-configuration when a UE's traffic profile changed and in RRC_INACTIVE.

In another disclosed method in FIG. 13 and FIG. 14, the UE 201 sends a request to the eNB when an eDRX configuration update is triggered by the upper lacers or a traffic profile change. The gNB 202 assists the UE 201 to dynamically turn on and off eDRX mode of operation or change eDRX configuration based on the information in the request, e.g. its traffic profiles. FIG. 13 shows an example procedure that eDRX configuration update is triggered by the change of UE traffic profile when the UE 201 is in RRC_Idle state. In the procedure, the UE 201 sends an AS message to the gNB 202 to update its eDRX parameter(s). The message may indicate the traffic profile change information. The message may also include the disclosed eDRX parameter in the message. The gNB 202 determines whether or not the eDRX parameter(s) of the UE 201 need to be changed based on information obtained from the core network. The detailed description of the method is as follows.

Step 310*a* of FIG. 13: The UE 201 registers to the Core Network and obtains the initial DRX configuration from AMF 203. The registration process may include identification of the UE capabilities to determine whether or not the UE 201 is a RedCap UE and associated capabilities, requirements, and characteristics. In one example, the UE 201 has an initial DRX configuration received from the AMF 203, and the UE 201 has traffic A and traffic B. The traffic A is not delay tolerant and the UE 201 cannot be in eDRX mode when the traffic is active. The traffic B is delay tolerant and the UE 201 can be in eDRX mode when all other traffic on the node is delay tolerant. When both traffic A and traffic B are active, the UE 201 cannot be in the eDRX mode. During the registration, the AMF 203 may know the characteristics of traffic A and traffic B.

Step 310*b* of FIG. 13: The AMF 203 sends assistance information to gNB 207 about the PTW associated with the traffic A and traffic B.

Step 311 of FIG. 13: An event is triggered to update eDRX configuration. For example, when the traffic profiles on the UE 201 changes, or additionally, energy characteristics on the UI 201 changes. The UE sends an AS message to gNB to request an eDRX configuration update including the traffic profile change information. For example, when traffic A is terminated and only traffic B is active, the UE can send an indication that traffic A is terminated. In another example, the UE sends an AS message to gNB to request an eDRX configuration update including the energy characteristic change information.

Step 312 of FIG. 13: The UE 201 sends an AS message to the gNB 202 to request an eDRX configuration update including the traffic profile change information. For example, the UE 201 uses the RRCSetupRequest message when performing an RRC Connection Establishment procedure; using the RRCResumeRequest/RRCResumeRequest1 message when performing an RRC Connection Resume procedure; or using the UEAssistanceInformation message when performing a UE Assistance Information procedure.

Step 313 of FIG. 13: The gNB 202 decides whether the eDRX parameter needs to be changed. If so, the gNB 202 sends a request to AMF 203 to assist UE 201 to update eDRX parameter. For example, after knowing the traffic A is terminated, the gNB 202 sends a request to AMF 203 to update the eDRX configuration. Additionally, the request may include, e.g., requirements for delivering emergency alerts, identified device type or capabilities (RedCap, RedCap type, or non-RedCap, and UE power/energy characteristics), determined/calculated available paging capacity or traffic load.

Step 314 of FIG. 13: The gNB 202 sends a request to AMF 203 to update the eDRX configuration.

Step 315 of FIG. 13: AMF 203 decides whether to accept or reject the request for using the new eDRX parameter and sends a response to the gNB 202. Determination of whether to accept or reject the request may be based on a number of factors including, e.g., requirements for delivering emergency alerts, identified device type (Redcap. RedCap type, or non-RedCap, and UE power/energy characteristics), determined/calculated available paging capacity of a network. Paging capacity can be directly impacted dependent upon duration of the configured paging timer windows.

Step 316 of FIG. 13. AMF 203 sends a response to the gNB 202 which includes the new eDRX parameter for the UE 201.

Step 317 of FIG. 13: The gNB 202 sends an AS message to the UE 201 to configure the new eDRX parameter. For example, using RRCReconfiguration message.

FIG. 14 shows an example procedure that the eDRX configuration update is triggered by the change of UE traffic profile when the UE 201 is in RRC_INACTIVE state. In the procedure, the UE 201 sends an AS message to gNB 202 to update its eDRX parameter. The message may indicate the traffic profile change information. The message may also include the disclosed eDRX parameter in the message. The gNB 202 determines whether the eDRX parameter(s) of the UI 201 need to be changed based on information obtained from the core network. The gNB 202 determines and configures the new eDRX parameter oldie UE 201 and notifies the AMF 203 the new eDRX parameter associated with the UE 201. The detailed description of the method is as follows.

Step 320a of FIG. 14: The UE 201 registers to the Core Network and obtains the initial DRX configuration from AMF 203. The registration process may include identification of the UE capabilities to determine whether or not the UE 201 is a RedCap UE and associated capabilities, requirements, and characteristics. In one example, the UE 201 has an initial DRX configuration received from the AMF 203, and the UE 201 has traffic A and traffic B. The traffic A is not delay tolerant and the UE 201 cannot be in eDRX mode when the traffic is active. The traffic B is delay tolerant and the UE 201 can be in eDRX mode when all other traffic on the node is delay tolerant. When both traffic A and traffic B are active, the UE 201 cannot be in the eDRX mode. During the registration, the AMF 203 may know the characteristics of traffic A and traffic B.

Step 320b: of FIG. 14 The AMF 203 sends assistance information to the gNB 202 about the PTW associated with the traffic A and traffic B.

Step 321 of FIG. 14: An event is triggered to update eDRX configuration. For example, when the traffic profiles on the UE 201 changes, or additionally, energy characteristics on the UE 201 changes. The UE 201 sends an AS message to the gNB to request an eDRX configuration update including the traffic profile change information. For example, when traffic A is terminated and only traffic B is active, the UE 201 can send an indication that traffic A is terminated. In another example, the UE sends an AS message to gNB to request an eDRX configuration update including the energy characteristic change information.

Step 322 of FIG. 14: The UE 201 sends an AS message to gNB 202 to request eDRX, configuration update including the traffic profile change information. For example, the UE 201 uses the RRCSetupRequest message when performing an RRC Connection Establishment procedure; using the RRCResumeRequest/RRCResumeRequest1 message when performing an RRC Connection Resume procedure; or using the UEAssistanceInformation message when performing a UE Assistance Information procedure.

Step 323 of FIG. 14: The gNB 202 decides whether the eDRX parameter(s) need to be changed based on the assistance information obtained in step 0b. Factors such as, requirements for delivering emergency alerts, identified device type or capabilities (RedCap, RedCap type, or non-RedCap, and UE power/energy characteristics), determined/calculated available paging capacity or traffic load of the gNB may be leveraged in the decision. If the eDRX parameter(s) need to be changed, the gNB 202 determines and configures the new eDRX parameter of the UE 201 and notifies the AMF 203 the new eDRX parameter associated with the UE 201.

Step 324a: of FIG. 14 The gNB 202 sends a request to AMF 203 to update the eDRX configuration.

Step 324b of FIG. 14: The gNB 202 sends an AS message to the UE 201 to configure the new eDRX parameter, for example, using an RRCReconfiguration message.

Network Initiated Dynamic eDRX Configuration

Disclosed herein is a description of subject matter for the network to dynamically turn on and off eDRX mode of operation or change eDRX configuration of a UE 201. The network may request to change eDRX configurations when the user plane information associated with the UE 201 changed. In the first disclosed method in FIG. 15, the network may send a UE 201 configuration update command to update the new eDRX parameter of the UE 201. The detailed description of the method is as follows.

Figure 15:
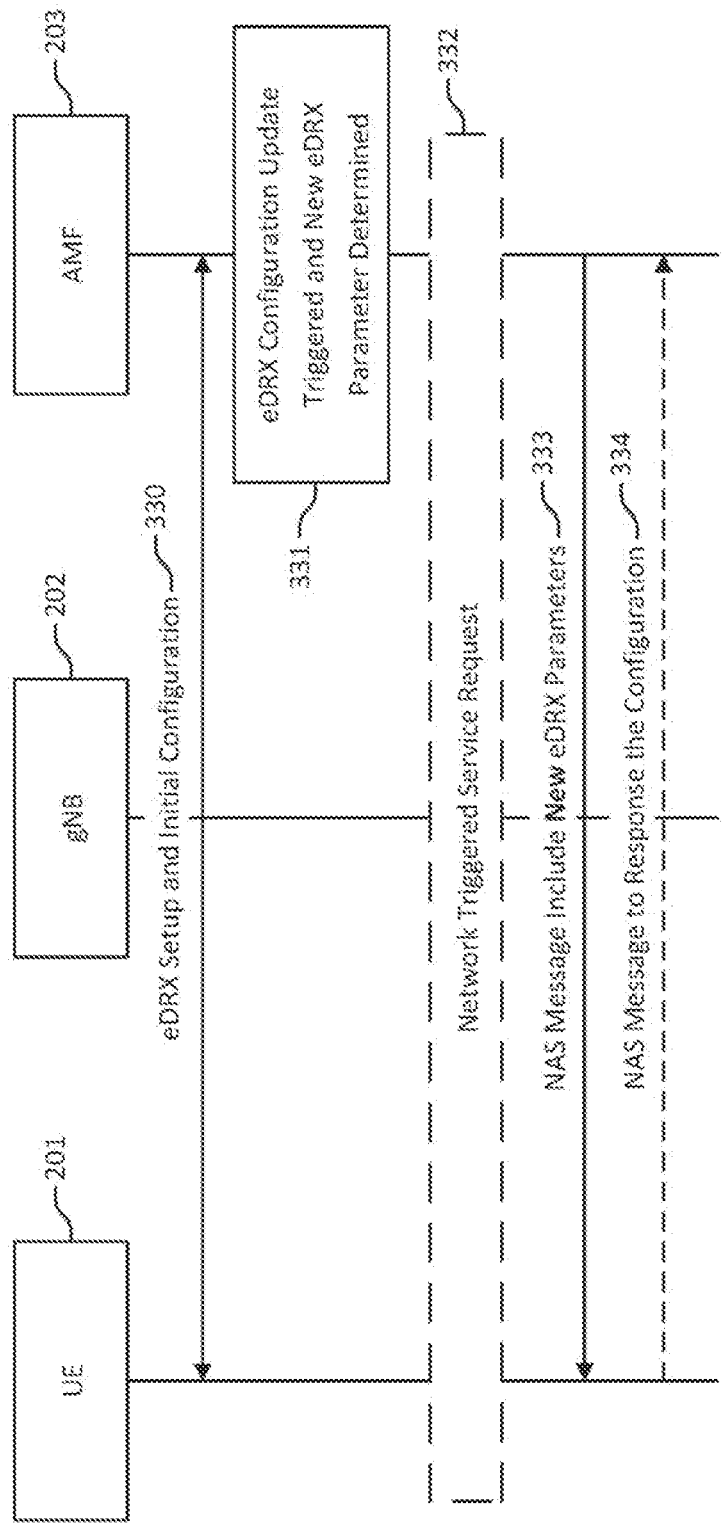
FIG. 15 illustrates UE Configuration Update procedure to update eDRX configuration.

Step 330 of FIG. 15: The UE 201 registers to the Core Network and obtains the initial DRX configuration from AMF 203. The registration process may include identification of the UE capabilities to determine whether or not the UE is a Redcap UE and associated capabilities, requirements, and characteristics.

Step 331 of FIG. 15: An event is triggered for the network to update the eDRX configuration. For example, when user plane information associated with the UE 201 changed, the AMF 203 decides a new set of eDRX configuration to the UE 201.

Step 332 of FIG. 15: If the UE 201 is in RRC idle, the AMF 201 initiates a network triggered service request procedure to establish a connection with the UE 201. During the procedure, the AMF 203 may send a NAS message which includes the new eDRX parameter associated with the UE 201.

Step 333 of FIG. 15: The AMF 203 sends a NAS Message which includes the new eDRX parameter associated with the UE 201. In one example, the NAS message is a UE configuration update command.

Step 334 of FIG. 15: The UE 201 may send a NAS message to response eDRX configuration. In one example, the NAS message is a UE configuration update complete message.

Figure 16:
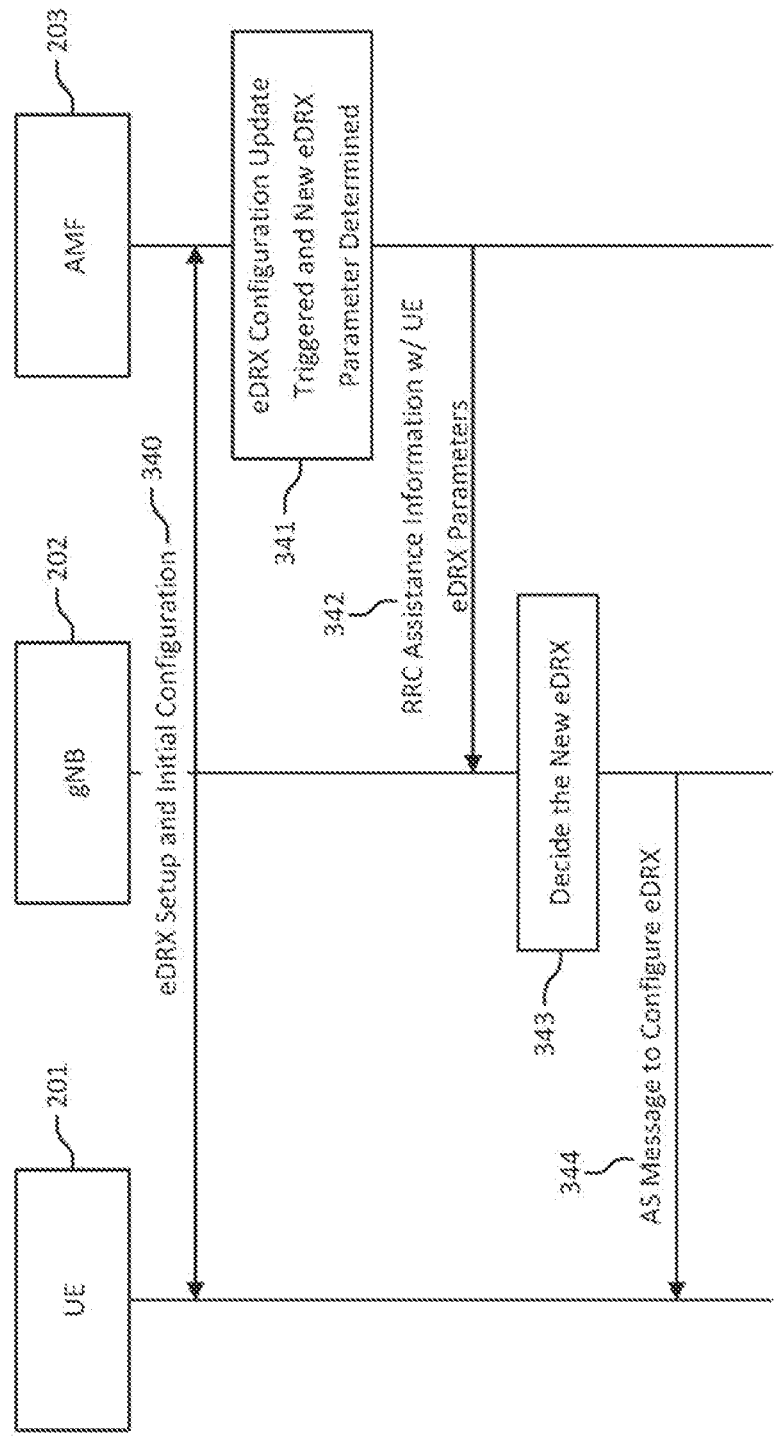
FIG. 16 illustrates gNB assisted eDRX cycle re-configuration initiated by the network.

In another disclosed method in FIG. 16, the network sends a request to the gNB 202 when an eDRX configuration update is triggered. The gNB 202 assists the AMF 203 to dynamically turn on and off eDRX mode of operation or change eDRX configuration based on the information in the request. The gNB 202 determines whether the eDRX parameters of the UE 201 need to be updated. The detailed description of the method is as follows.

Step 340 of FIG. 16: The UE 201 registers to the Core Network and obtains the initial DRX configuration from AMF 203. The registration process may include identification of the UE capabilities to determine whether or not the UE 201 is a RedCap UE and associated capabilities, requirements, and characteristics.

Step 341: of FIG. 16 An event is triggered for the network to update the eDRX configuration. For example, when user plane information associated with the UE 201 changed, the AMF 203 decides a new set of eDRX configuration information elements to the UE 201.

Step 342: of FIG. 16 The AMF 203 sends an RRC Assistance information message to the gNB 202, which includes the new eDRX parameter(s) associated with the UE 201.

Step 343 of FIG. 16: The gNB 202 decides whether the eDRX parameter(s) need to be changed based on the assistance information obtained in step 342. Factors such as, e.g., requirements for delivering emergency alerts, identified device type or capabilities (Redcap, Redcap type, or non-RedCap, and UE power/energy characteristics), determined/calculated available paging capacity or traffic load of the gNB 202 may be leveraged in the decision. If the eDRX parameter(s) need to be changed, the gNB 202 determines and configures the new eDRX parameter associated with the UE 201.

Step 344 of FIG. 16: The gNB 202 sends an AS message to the UE 201 to configure the new eDRX parameter, for example, using an RRCReconfiguration message.

It is understood that the entities performing the steps illustrated herein, such as FIG. 4-FIG. 16, may be logical entities. The steps may be stored in a memory of, and executing on a processor of, a device, server, or computer system such as those illustrated in FIG. 18F or FIG. 18G. Skipping steps, combining steps, or adding steps between exemplary methods disclosed herein (e.g., FIG. 4-FIG. 16) is contemplated. Table 4 provides exemplary abbreviations.

TABLE 4

Abbreviations and Definitions

| Abbreviations | Definitions |
| --- | --- |
| AMF | Access and Mobility Management Function |
| BCH | Broadcast Channel |
| BR-P-RNTI | Bandwidth Reduced Paging Radio Network Temporary Identifier |
| BW | Bandwidth |
| BWP | Bandwidth Part |
| BR | Bandwidth Reduced |
| CMAS | Commercial Mobile Alert Service |
| CN | Core Network |
| DCI | Downlink Control Information |
| DL | Downlink |
| DL-SCH | DL Shared Channel |
| DRX | Discontinuous Reception |
| eDRX | Extended DRX |
| eMBB | Enhanced Mobile Broadband |
| ETWS | Earthquake & Tsunami Warning System |
| eURLLC | Enhanced Ultra-Reliable and Low Latency Communication |
| E-UTRA | Evolved Universal Terrestrial Radio Access |
| FDD | Frequency Division Duplex |
| FR1 | Frequency 1 |
| FR2 | Frequency 2 |
| gNB | NR NodeB |
| GPS | Global Positioning System |
| IMT | International Mobile Telecommunications |
| IWSN | Industrial Wireless Sensor Networks |
| LOS | Line of Sight |
| LTE | Long Term Evolution |
| MCS | Modulation and Coding Scheme |
| MHz | Mega-Hertz |
| MIB | Master Information Block |
| MME | Mobility Management Entity |
| MO | Monitoring Occasion |
| MTC | Machine Type Communication |
| NAS | Non-Access Stratum |
| NB | Narrowband |
| NB-IoT | Narrowband Internet of Things |
| NPDCCH | Narrowband Physical Downlink Control Channel |
| NR | New Radio |
| NW | Network |

TABLE 4-continued

Abbreviations and Definitions

| Abbreviations | Definitions |
| --- | --- |
| IE | Information Element |
| IMSI | International Mobile Subscriber Identity |
| OAM | Operations, Administration and Maintenance |
| OFDM | Orthogonal Frequency Division Multiplexing |
| PBCH | Physical Broadcast Channel |
| PCCH | Paging Common Control Channel |
| PDCCH | Physical Downlink Control Channel |
| PDSCH | Physical Downlink Shared Channel |
| PF | Paging Frame |
| PNB | Paging Narrowband |
| PO | Paging Occasion |
| PRACH | Physical Random Access Channel |
| PRB | Physical Resource Block |
| P-RNTI | Paging Radio Network Temporary Identifier |
| PSM | Power Saving Mode |
| PTW | Paging Time Window |
| PWS | Public Warning System |
| RACH | Random Access Channel |
| RAN | Radio Access Network |
| RAT | Radio Access Technology |
| RB | Resource Block |
| RedCap | Reduced Capability |
| RMSI | Remaining Minimum System Information |
| RRC | Radio Resource Control |
| RX | Receive |
| SCS | Sub-Carrier Spacing |
| SFN | System Frame Number |
| SI | System Information |
| SID | Study Item Description |
| SI-RNTI | System Information Radio Network Temporary Identifier |
| SIB | System Information Block |
| SSB | Synchronization Signal Block |
| S-TMSI | Shortened-Temporary Mobile Subscriber Identity |
| TAU | Tracking Area Update |
| TB | Transport Block |
| TBS | Transport Block Size |
| TDD | Time Division Duplex |
| WTRU | Wireless Transmit/Receive Unit |

Figure 17:
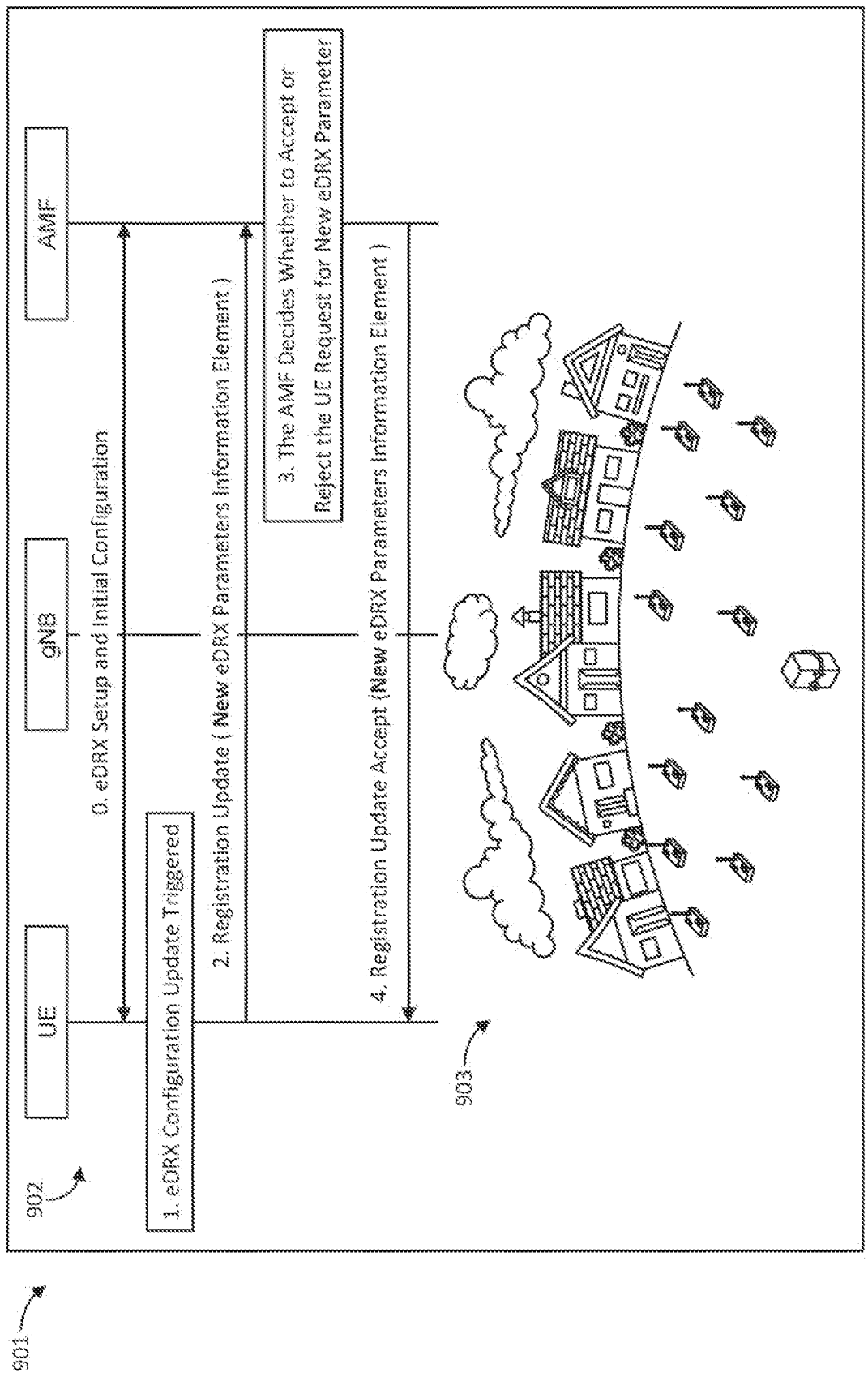
FIG. 17 illustrates an exemplary display (e.g., graphical user interface) that may be generated based on the methods, systems, and devices of eDRX enhancement for reduced capability NR devices.

FIG. 17 illustrates an exemplary display (e.g., graphical user interface) that may be generated based on the methods, systems, and devices of eDRX enhancement for reduced capability NR devices, as discussed herein. Display interface 901 (e.g., touch screen display) may provide text in block 902 associated with of eDRX enhancement for reduced capability NR devices, such as related parameters, method flows, and associated current conditions. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices of eDRX enhancement for reduced capability NR devices, a graphical output of the progress of any method or systems discussed herein, or the like.

The 3rd Generation Partnership Project (3GPP) develops technical standards for cellular telecommunications network technologies, including radio access, the core transport network, and service capabilities—including work on cadets, security, and quality of service. Recant radio access technology (RAT) standards include WCDMA (commonly referred as 3G), LTE (commonly referred as 4G). LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz with cmWave and mmWave specific design optimizations.

3GPP has identified a variety of use cases that NR is expected to support, resulting in a wide variety of user experience requirements for data rate, latency, and inability. The use cases include the following general categories; enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V). Vehicle-to-Infrastructure Communication (V2I). Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 18A:
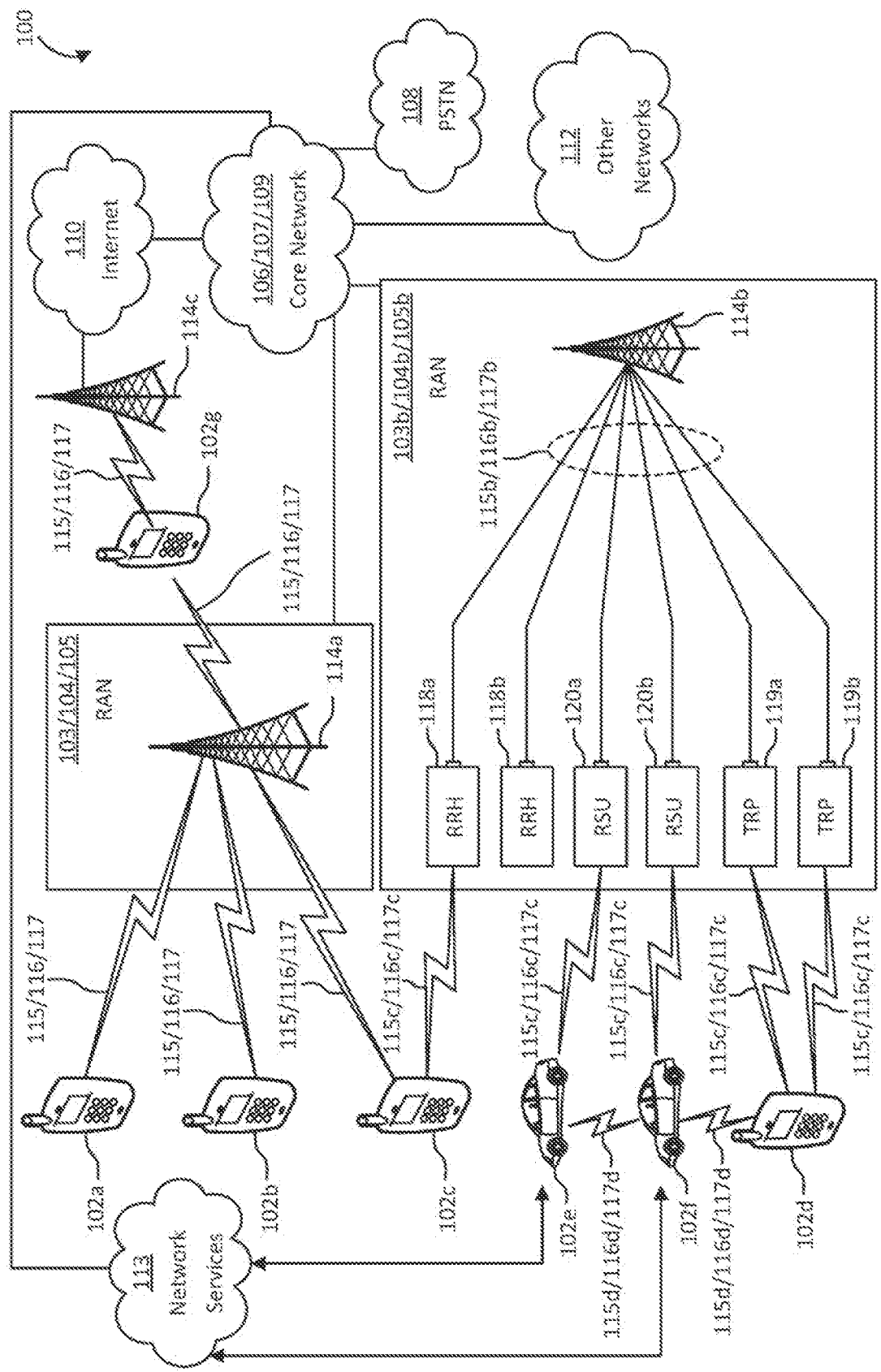
FIG. 18A illustrates an example communications system.

FIG. 18A illustrates an example communications system 100 in which the methods and apparatuses of eDRX enhancement for reduced capability NR devices, such as the systems and methods illustrated in FIG. 1 through FIG. 16 described, and claimed herein may be used. The communications system 100 may include wireless transmit/receive units (WTRUs) 102*a*, 102*b*, 102*c*, 102*d*, 102*e*, 102*f*, or 102*g* (which generally or collectively may be referred to as WTRU 102 or WTRUs 102). The communications system 100 may include, a radio access network (RAN) 103/104/ 105/103*b*&104*b*/105*b*, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102*a*. 102*h*, 102*c*, 102*d*, 102*e*, 102*f*, or 102*g* may be any type of apparatus or device configured to operate or communicate in a wireless environment. Although each WTRU 102*a*, 102*b*, 102*c*, 102*d*, 102*e*, 102*f*, or 102*g* may be depicted in FIG. 18A, FIG. 18B, FIG. 18C, FIG. 18D, FIG. 18E, or FIG. 18F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114*a* and a base station 114*b*. In the example of FIG. 18A, each base stations 114*a* and 114*b* is depicted as a single element. In practice, the base stations 114*a* and 1141, may include any number of interconnected base stations or network elements. Base stations 114*a* may be any type of device configured to wirelessly interface with at least one of the WTRUs 102*a*, 102*b*, and 102*c* to facilitate access to one or more communication networks, such as the core network 106/107/109, the Internet 110, Network Services 113, or the other networks 112. Similarly, base station 114*b* may be any type of device configured to wiredly or wirelessly interface with at least one of the Remote Radio Heads (RRHs) 118*a*, 118*b*, Transmission and Reception Points (TRPs) 119*a*, 119*b*, or Roadside Units (RSUs) 120*a* and 120*b* to facilitate access to one or more communication networks, such as the core network 106/107/109, the Internet 110, other networks 112, or Network Services 113. RRHs 118*a*, 118*b* may be any type of device configured to wirelessly interface with at least one of the WTRUs 102. e.g., WTRU 102*c*, to facilitate access to one or more communication networks, such as the core network 106/107/109, the Internet 110, Network Services 113, or other networks 112

TRPs 119*a*, 119*b* may be any type of device configured to wirelessly interface with at least one of the WTRU 102*d*, to facilitate access to one or more communication networks, such as the core network 106/107/109, the Internet 110, Network Services 113, or other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, other networks 112, or Network Services 113. By way of example, the base stations 114*a*, 114*b* may be a Base Transceiver Station (BTS), a Node-B, an eNode B, a Home Node B, a Home eNode B, a Next Generation Node-B (gNodeB), a satellite, a site controller, an access point (AP), a wireless router, and the like.

The base station 114*a* may be part of the RAN 103/104/ 105, which may also include other base stations or network elements (not shown), such as a Base Station Controller (BSC), a Radio Network Controller (RNC), relay nodes, etc. Similarly, the base station 114*b* may, be part of the RAN 103*b*/104*b*/105*b*, which may also include other base stations or network elements (not shown), such as a BSC, a RNC, relay nodes, etc. The base station 114*a* may be configured to transmit or receive wireless signals within a particular geographic region, which may be referred to as a cell (not shown). Similarly, the base station 114*b* may be configured to transmit or receive wired or wireless signals within a particular geographic region, which may be referred to as a cell (not shown) for methods, systems, and devices of eDRX enhancement for reduced capability NR devices, as disclosed herein. Similarly, the base station 114*b* may be configured to transmit or receive wired or wireless signals within a particular geographic region, which may be referred to as a cell (not shown). The cell may further be divided into cell sectors. For example, the cell associated with the base station 114*a* may be divided into three sectors. Thus, in an example, the base station 114*a* may include three transceivers, e.g., one for each sector oldie cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, etc.). The air interface 115/116/117 may be established using any suitable radio access technology (RAT).

The base stations 114b may communicate with one or more of the RRHs 118a, 1 Kb, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.) The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interlace 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared UR), ultraviolet (UV), visible light, cmWave, mmWave, etc.) The air interface 115d/116d/117d may be established using any suitable radio access technology (RAT).

The communications systems 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120h, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/115c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103h/103b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104h/105h and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000) (IS-2000), Interim Standard 95 (IS-95). Interim Standard 856 (IS-856), Global System for Mobile communications (GSM), Enhanced Data rates for GSM Evolution (EDGE), GSM EDGE (GERAN), and the like.

The base station 114c in FIG. 18A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of eDRX enhancement for reduced capability NR devices, as disclosed herein. In an example, the base station 114e and the WTRUs 102, e.g., WTRU 102e, may implement a radio technology such as IEEE 802.11 to establish a wireless local area network (WLAN), similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 18A, the base station 114c may have a direct connection to the Internet 110. Thus, the base station 114e may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 18A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the intense protocol (IP) in the TCP/IP internet protocol suite.

The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of eDRX enhancement for reduced capability NR devices, as disclosed herein. For example, the WTRU 102g shown in FIG. 18A may be configured to communicate with the base station 114a, which may employ a cellular-based radio technology, and with the base station 114c, which may employ an IEEE 802 radio technology.

Although not shown in FIG. 18A, it will be appreciated that a User Equipment may make a wired connection to a gateway. The gateway may be a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115c/116c/117c may equally apply to a wired connection.

Figure 18B:
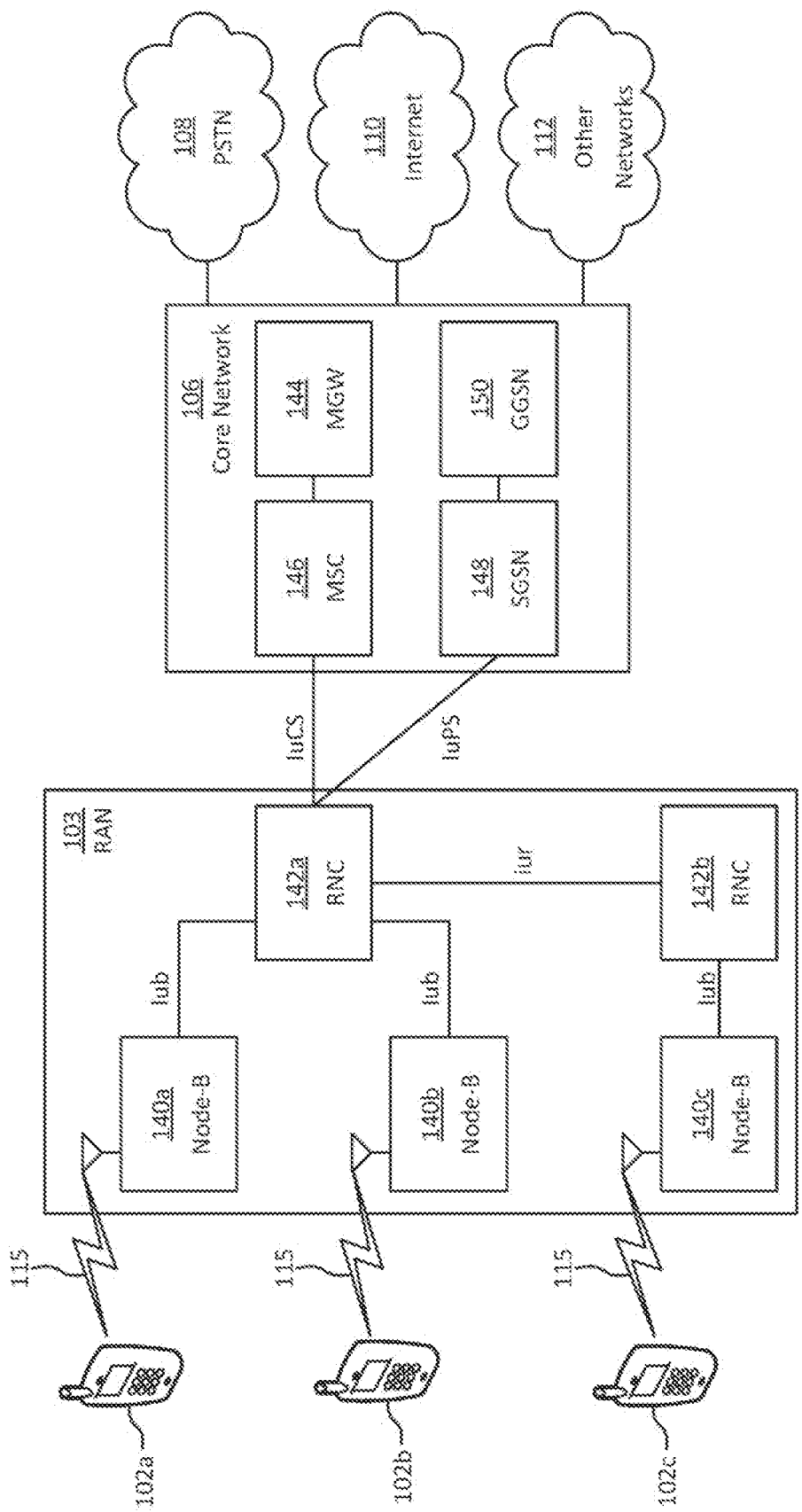
FIG. 18B illustrates an exemplary system that includes RANS and core networks.

FIG. 18B is a system diagram of an example RAN 103 and cote network 106 that may implement methods, systems, and devices of eDRX enhancement for reduced capability NR devices, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 18B, the RAN 103 may include Node-Bs 140a, 140b, and 140c, which may each include one or more transceivers for communicating with the WTRU s 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 10:3 may include any number of Node-Bs and Radio Network Controllers (RNCs.)

As shown in FIG. 18B, the Node-Bs 140a, 140b may be in communication with the RNC 142a Additionally, the Node-B 140c may be in communication with the RNC 142b. The Node-Bs 130x, 140b, and 140c may communicate with the respective RNCs 142a and 142b via an Iub interface. The RNCs 142a and 142b may be in communication with one another via an Iub interface. Each of the RNCs 142a and 142b may be configured to control the respective Node-Bs 140a, 140h, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 18B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 18C:
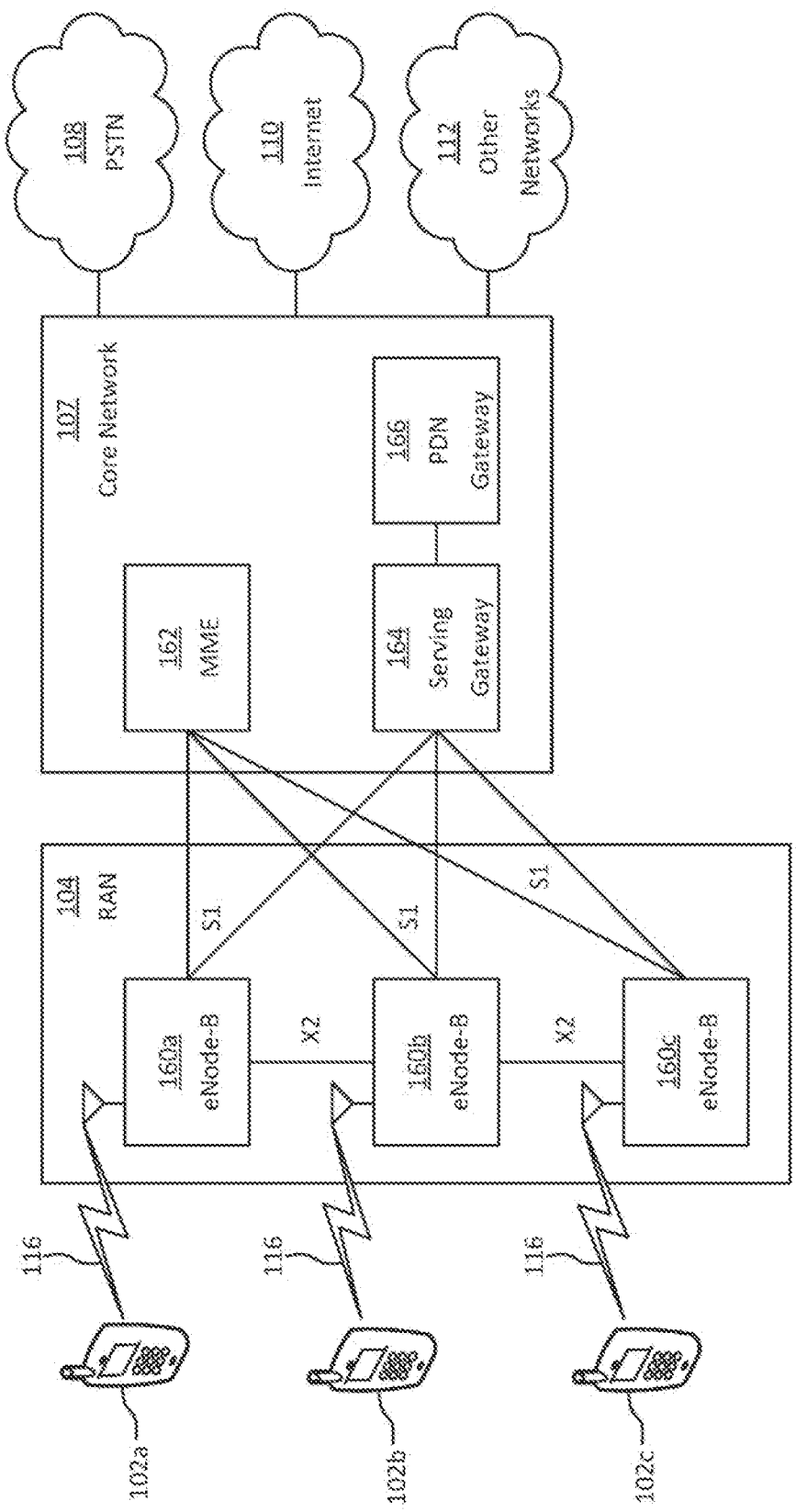
FIG. 18C illustrates an exemplary system that includes RANS and core networks.

FIG. 18C is a system diagram of an example RAN 104 and core network 107 that may implement methods, systems, and devices of eDRX enhancement for reduced capability NR devices, as disclosed herein. As noted above, the RAN 104 may employ an F-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 18C, the eNode-Bs 160a, 160b, and 160c may communicate with one another over an X2 interface.

The core network 107 shown in FIG. 18C may include a Mobility Management Gateway (IMF) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 103 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 18D:
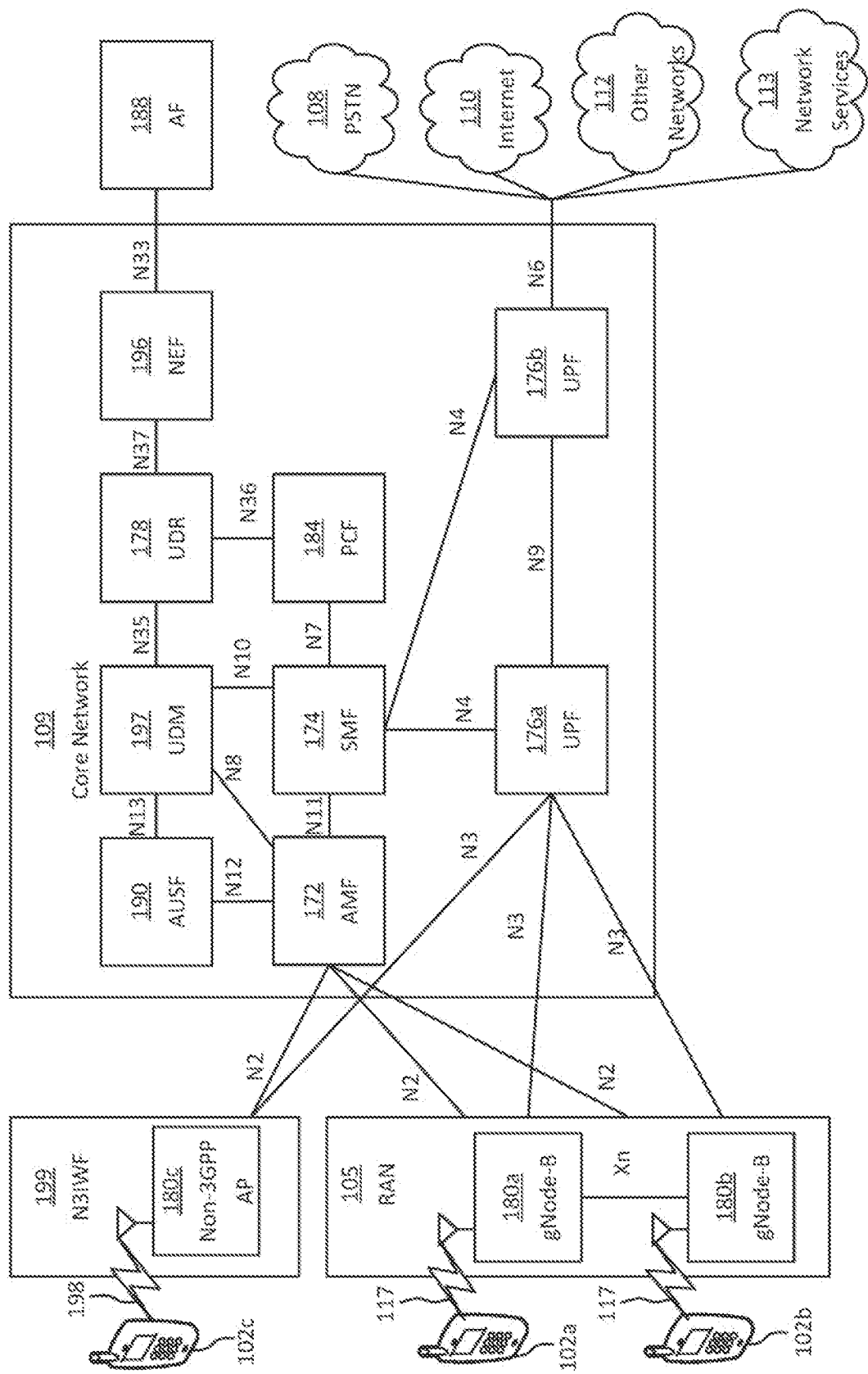
FIG. 18D illustrates an exemplary system that includes RANS and core networks.

FIG. 18D is a system diagram of an example RAN 105 and core network 109 that may implement methods, systems, and devices of eDRX enhancement for reduced capability NR devices, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode 13s and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 18D, the gNode-Bs 180a and 180b may communicate with one another over an Xn interface, for example.

The core network 109 shown in FIG. 18D may be a 5G core network (5GC). The core network 109 may offer numerous communication services to customers who are interconnected by the radio access network. The core network 109 comprises a number of entities that perform the functionality of the core network. As used herein, the term "Core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 18G.

In the example of FIG. 18D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as pan of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 18D shows that network functions dimity connect with one another, however, it should be appreciated that they may communicate via routing, agents such as a diameter routing agent or message buses.

In the example of FIG. 18D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive die user plane tunnel configuration information from the SMF via an N11 interface. The AMF 172 may generally route and forward NAS packets to/from the WTRUs 102a, 102b, and 102c via an N1 interface. The N1 interface is not shown in FIG. 18D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176*a* and UPF 176*b*, and generation of downlink data notifications to the AMF 172.

The UPF 176*a* and UPF 176*b* may provide the WTRUs 102*a*, 102*b*, and 102*c* with access to a Packet Data Network (PDN), such as the Internet 110, to facilitate communications between the WTRUs 102*a*, 102*b*, and 102*c* and other devices. The UPF 176*a* and UPF 176*b* may also provide the WTRUs 102*a*, 102*b*, and 102*c* with access to other types of packet data networks. For example. Other Networks 112 may be Ethernet Networks or any type of network that exchanges packets of data. The UPF 176*a* and UPF 176*b* may receive traffic steering rules from the SMF 174 via the N4 interface. The UPF 176*a* and UPF 176*b* may provide access to a packet data network by connecting a packet data network with an N6 interface or by connecting to each other and to other UPFs via an N9 interface. In addition to providing access to packet data networks, the UPF 176 may be responsible packet routing and forwarding, police rule enforcement, quality of service handling for user plane traffic, downlink packet buffering.

The AMF 172 may also be connected to the N3IWF 199, for example, via an N2 interface. The N3IWF facilitates a connection between the WTRU 102*c* and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interlace, and to an Application Function (AF) 188 via an N5 interface. The N15 and N5 interfaces are not shown in FIG. 18D. The PCF 184 may provide policy rules to control plane nodes such as the AMF 172 and SMF 174, allowing the control plane nodes to enforce these rules. The PCF 184, may send policies to the AMF 172 for the WTRUs 102*a*, 102*b*, and 102*c* so that the AMP may deliver the policies to the WTRUs 102*a*, 102*b*, and 102*c* via an N1 interface. Policies may then be enforced, or applied, at the WTRUs 102*a*, 102*b*, and 102*c*.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an NB interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the NB API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered pan of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality performance and isolation.

3GPP has designed the 5G core network to support Network Slicing. Network Slicing is a good tool that network operators can use to support the diverse set of 5G use cases massive IoT, critical communication, V2X, and enhanced mobile broadband) which demand very diverse and sometimes extreme requirements. Without the use of network slicing techniques, it is likely that the network architecture would not be flexible and scalable enough to efficiently support a wider range of use cases new when each use case has its own specific set of performance, scalability, and availability requirements. Furthermore, introduction of new network services should be made more efficient.

Referring again to FIG. 18D, in a network slicing scenario, a WTRU 102*a*, 102*b*, or 102*c* may connect with an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned or operated by other service providers.

Figure 18E:
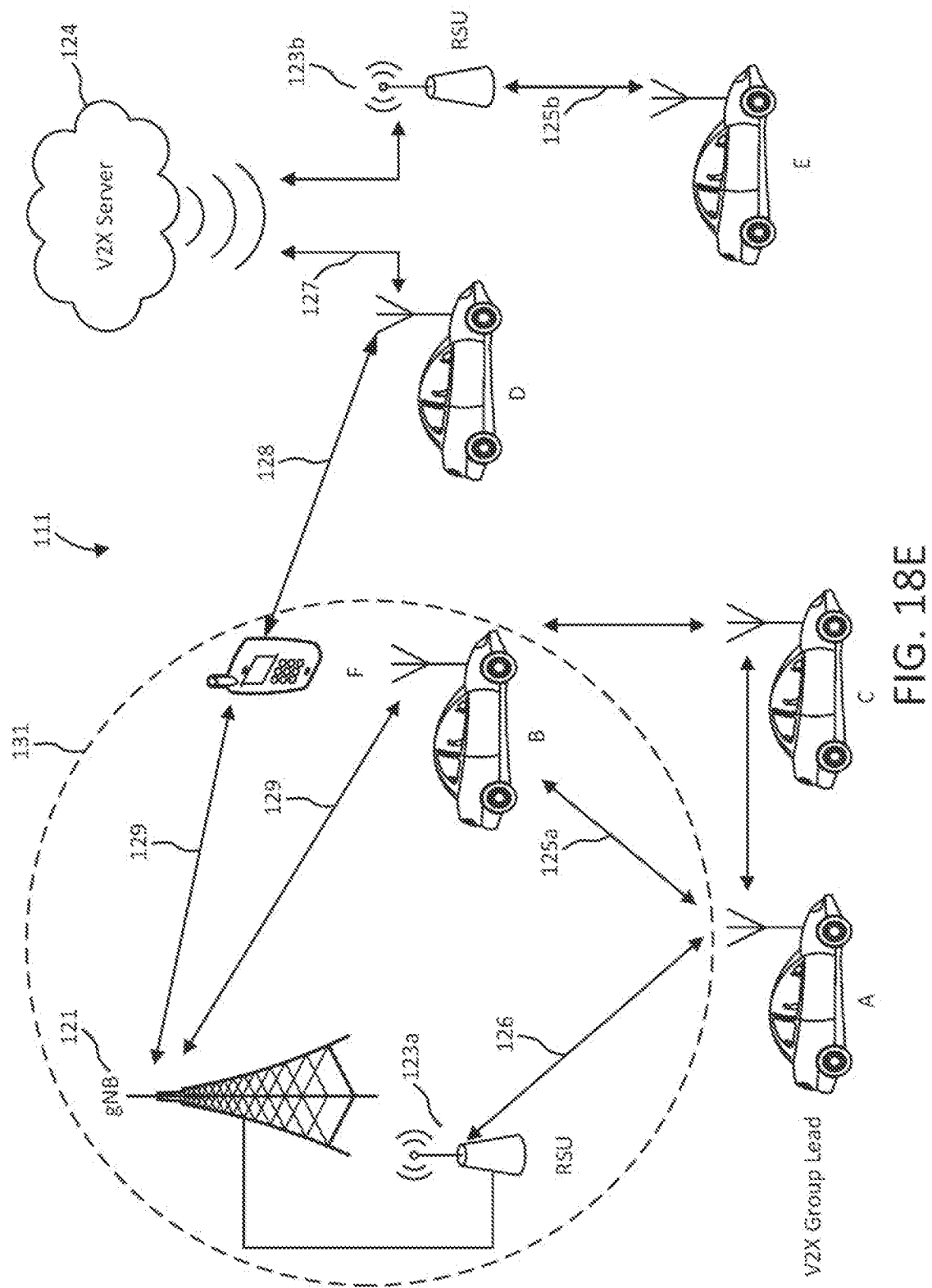
FIG. 18E illustrates another example communications system.

The core network entities described herein and illustrated in FIG. 18A, FIG. 18C. FIG. 18D, or FIG. 18E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 18A, FIG. 18B, FIG. 18C, FIG. 18D, or FIG. 18E are provided by way of example only, and it is understood that the subject matter disclosed and claimed herein may be embodied or implemented in any similar communication system, whether presently defined or defined in the future.

FIG. 18E illustrates an example communications system 111 in which the systems, methods, apparatuses that implement eDRX enhancement for reduced capability NR devices, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs. V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131: In the example of FIG. 18E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 18E, WRTU D, which is outside of the access network coverage 131, communicates with WTRU F, which is inside the coverage 131.

WRTUs A, B, C, D, E, and F may communicate with RSU 123a or 123b via a Vehicle-to-Network (V2N) 133 or Sidelink interface 125b. WTRUs A, B, C, D, F, and F may communicate to a V2X Server 124 via a Vehicle-to-Infrastructure (V2I) interface 127. WTRUs A, B, C, D, E, and F may, communicate to another UE via a Vehicle-to-Person (V2P) interface 128.

Figure 18F:
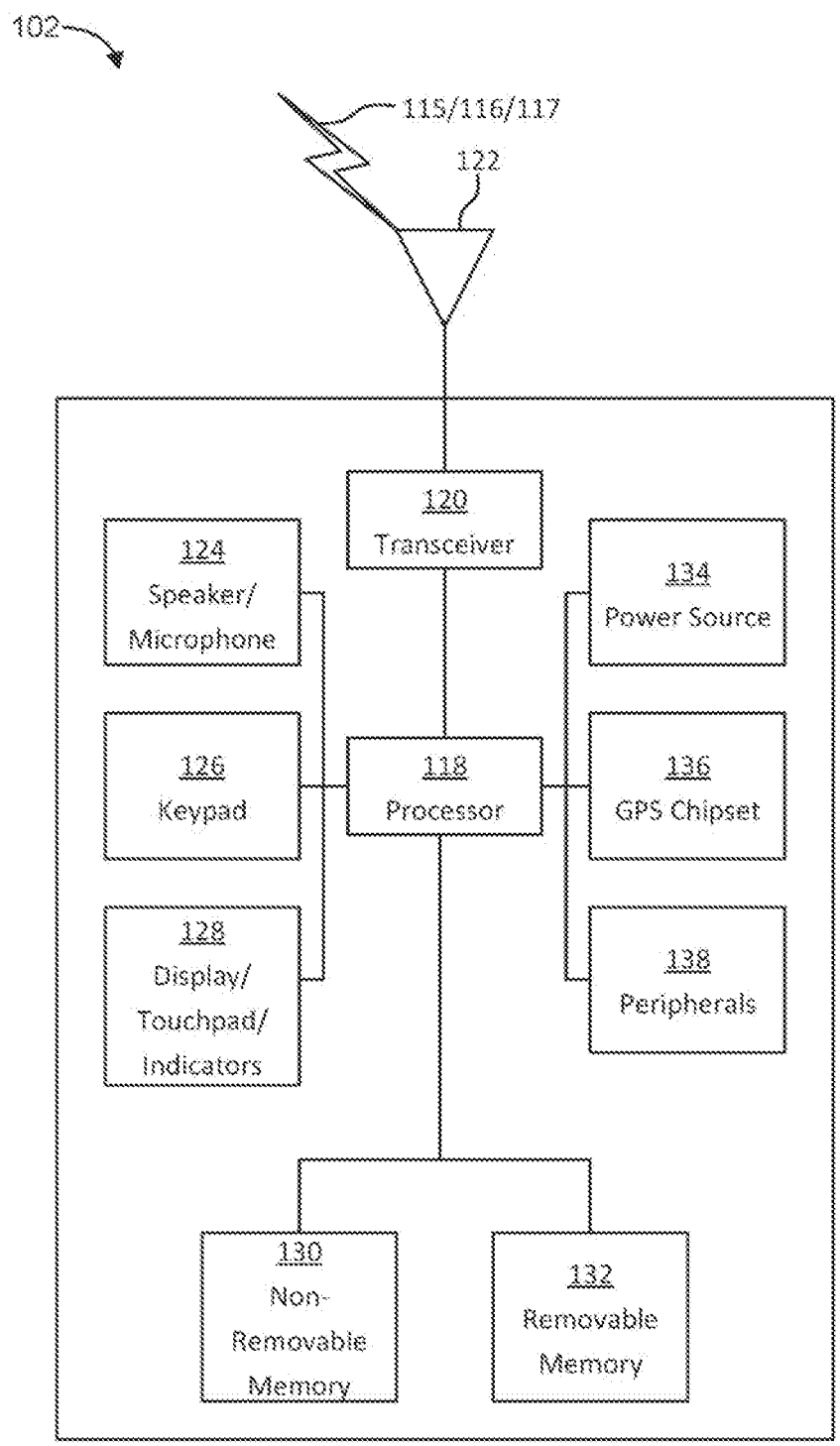
FIG. 18F is a block diagram of an example apparatus or device, such as a WTRU.

FIG. 18F is a block diagram of an example apparatus or device WTRU 102 that may be configured for wireless communications and operations in accordance with the systems, methods, and apparatuses that implement eDRX enhancement for reduced capability NR dices, described herein, such as a WTRU 102 of FIG. 18A, FIG. 18B, FIG. 18C, FIG. 18D, or FIG. 18E, or FIG. 1-FIG. 16 (e.g. UEs). As shown in FIG. 18F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system ((IPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNode-B), a home evolved node-B (HeNB), a home evolved node-B gateway, a next generation node-B (gNode-B), and proxy nodes, among others, may include some or all of the elements depicted in FIG. 18F and may be an exemplary implementation that performs the disclosed systems and methods for device triggering described herein.

The processor 118 may be a general purpose processor, a special purpose processor, a conventional processor, a digital signal processor (DSP), a plurality of microprocessors, one or more microprocessors in association with a DSP core, a controller, a microcontroller. Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 18F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 18A) over the air interface 115/116/117 or another UE over the air interface 115d/116d/117d. For example, the transmit/receive element 122 may be an antenna configured to transmit or receive RE signals. The transmit/receive element 122 may be an emitter/detector configured to transmit or receive IR, UV, or visible light signals, for example. The transmit/receive element 122 may be configured to transmit and receive both RE and light signals. It will be appreciated that the transmit/receive element 122 may be configured to transmit or receive any combination of wireless or wired signals.

In addition, although the transmit/receive element 122 is depicted in FIG. 18F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs. TRPs. RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED)) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the systems area in some of the examples described herein are successful or unsuccessful, or otherwise indicate a status of eDRX enhancement for reduced capability NR devices and associated components. The control lighting patterns, images, or colors on the display or indicators 128 may be reflective of the status of any of the method flows or components in the FIG.'s illustrated or discussed herein (e.g., FIG. 4-FIG. 16, etc.). Disclosed herein are messages and procedures of eDRX enhancement for reduced capability NR devices. The messages and procedures may be extended to provide interface/API for users to request resources via an input source (e.g., speaker/microphone 124, keypad 126, or display/touchpad/indicators 128) and request, configure, or query eDRX enhancement for reduced capability NR devices related information, among other things that may be displayed on display 128.

The processor 118 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like. Additional considerations, especially for Redcap devices, power sources may be intermittent and vary with time. Wireless power transfer and energy harvesting (e.g., RF charging, solar power and the like), power dissipation or charging rates, and power level threshold information can be leveraged by the WIRE for triggering paging configuration updates.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera. (for photographs or video), a universal serial bus toss) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or deuces, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 18G:
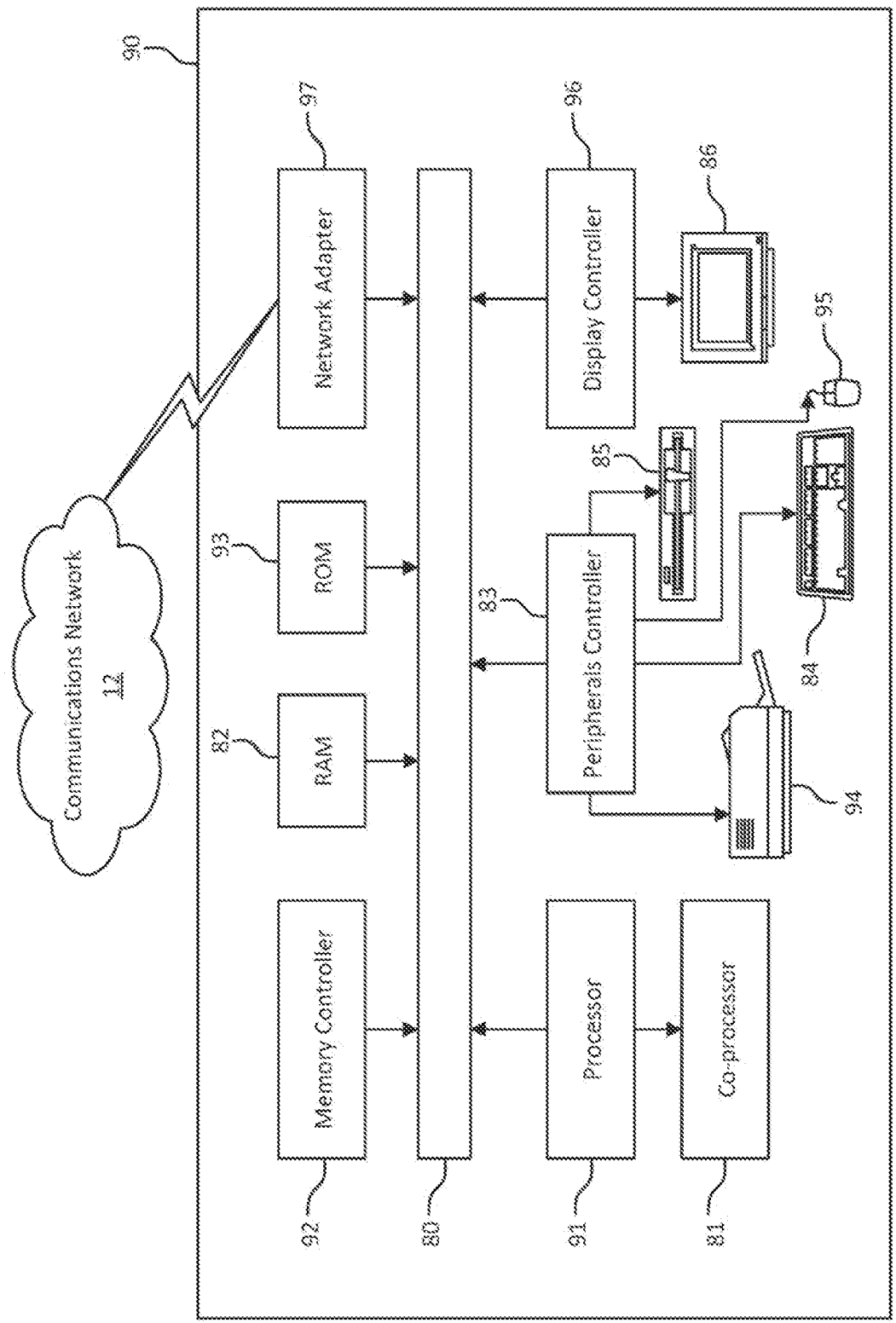
FIG. 18G is a block diagram of an exemplary computing system.

FIG. 18G is a block diagram of an exemplary computing system 90 in which one or more apparatuses of the communications networks illustrated in FIG. 18A. FIG. 18C. FIG. 18D and FIG. 18E as well as eDRX enhancement for reduced capability NR devices, such as the systems and methods illustrated in FIG. 1 through FIG. 16 described and claimed herein may be embodied, such as certain nodes or functional entities in the RAN 103/104/105, Core Network 106/107/109, PSTN 108, Internet 110. Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for eDRX, such as receiving eDRX related messages.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 18A, FIG. 18B, FIG. 18C. FIG. 18D, or FIG. 18E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure eDRX enhancement for reduced capability NR devices—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, apparatus, and the like may provide for eDRX enhancements for reduced capability NR devices. In an example, an apparatus may receive paging configuration information (e.g., PTW. WUS, DRX/eDRX, etc. configuration) from a 2nd apparatus to monitor a plurality of PDCCH monitoring occasions; receive paging configuration information from a 3rd apparatus to monitor a plurality of PDCCH monitoring occasions; determine when to monitor a set of PDCCH monitoring occasions based on the paging configuration information received from the second and third apparatuses; determine when to send a request to change when to monitor a set of PDCCH monitoring occasions; and send a request to change when to monitor a sot of PDCCH monitoring occasions. There may be continued monitoring of a set of PDCCH monitoring occasions outside (e.g., after or end) of the configured Paging Time Window radio frame when monitoring a set of PDCCH monitoring occasions outside of Paging Time Window radio frame. The apparatus may be identified as a Reduced Capabilities (RedCap) device or a particular type of RedCap device. The apparatus may receive paging configuration information from a 2nd apparatus (e.g., base station—nodeB) or 3rd apparatus (e.g., an AMF or other core network device) to monitor a plurality of PDCCH monitoring occasions specifically configured for the identified device type. The request to change when to monitor a set of PDCCH monitoring occasions may be triggered based on the change of a traffic profile. The traffic profiles may be associated with an RRC state or with an emergency alert (e.g., CMAS, PWS, or ETWS). The paging configuration information from a 2nd apparatus or a 3rd apparatus to monitor a plurality of PDCCH monitoring occasions is modified based on a change of a traffic profile, wherein the change in traffic profile may be planned, or predictive. The change in traffic profile or change in planned traffic profile or prediction of traffic profile may be reported from the device to the Network. The device (e.g., one of the apparatuses) receives paging configuration information inclusive of a common starting point for paging timing window information that is coordinated between the 2nd apparatus and the 3rd apparatus. The device receives paging configuration information inclusive of a paging timing window extension indication via one or more of the following: receive a paging request message from the second apparatus initiated by the third apparatus; receive prior to the 2nd apparatus transmitting a paging DCI; receive in a channel that is based on a matched filter or correlation metric: receive in a Wake-Up-Signal (WUS), receive in an RRC configuration message; or receive in a System Information Update message. In an example, a method may include determining paging timing window information for a plurality of PDCCH monitoring occasions based on receiving paging timing window information from a Core Network (e.g., AMF); transmuting to an apparatus, the paging timing window information for when to monitor a set of PDCCH monitoring occasions, and evaluating requests from one or more apparatus for changing when to monitor a set of PDCCH monitoring occasions. Based on the evaluating of the request, sending a response. The response may include an indication whether and when to change the set of PDCCH monitoring occasions. All combinations in this paragraph and the below paragraph (including the removal or addition of steps) are contemplated in a manner that is consistent with the other portions of the detailed description.

Methods, systems, apparatus, and the like may provide for eDRX enhancements for reduced capability NR devices. In an example, an apparatus may receive an event trigger to modify the paging configuration information; receiving a configuration update command to modify paging configuration information from a Core Network; and sending a configuration update complete message upon completion. The paging configuration information may be validated and reconfigured as determined by the gNB based on assistance information received from the Core Network. In an example, an apparatus may monitor PDCCH monitoring occasions, wherein the PDCCH monitoring occasions are associated with a paging occasion (PO) that overlaps with a paging timing window (PTW) and is not fully contained within the PTW, and the first apparatus is configured to perform one or more of the following: 1) monitor all the PDCCH monitoring occasions outside the PTW that belongs to the PO that overlaps with the PTW; 2) monitor a preconfigured number of PDCCH monitoring occasions outside PTW that belong to the PO that overlaps with the PTW; 3) monitor only a complete PO that is fully contained with the PTW; or 4) monitor PDCCH monitoring occasions until a page is received within the PO or until the PO ends. In an example, an apparatus may receive paging configuration information from the second apparatus or a third apparatus to monitor a plurality of PDCCH monitoring occasions specifically configured for one or more of the following identified device types and characteristics: 1) Reduced Capabilities (Redcap) device; 2) particular type of RedCap device; or 3) power characteristics. The first apparatus may report to the second apparatus or the third apparatus a change in traffic profile or in planned or prediction of traffic profile, and receives from the second apparatus or the third apparatus as a result of reporting to the second apparatus or the third apparatus a change in traffic profile or in planned or prediction of traffic profile, an update to the set of PDCCH monitoring occasions. The second apparatus or third apparatus may modify the paging configuration information in the first apparatus, based on a change of the available paging capacity of the network. The first apparatus may receive periodically in system information based on beam sweeping or SSB burst patterns, the paging configuration information including a paging timing window (PTW) from the second apparatus. All combinations in this paragraph (including the removal or addition of steps) are contemplated in a manner that is consistent with the other portions of the detailed description.

What is claimed:

1. A method performed by a first apparatus, the method comprising:
   receiving first paging configuration information from a second apparatus relative to a set of physical downlink control channel (PDCCH) monitoring occasions; and
   based on the first paging configuration information, perform a process comprising:
   determining a paging timing window (PTW) for monitoring the set of PDCCH monitoring occasions;
   determining a time to send a request to change the PTW for monitoring the set of PDCCH monitoring occasions;
   sending a request to change the PTW at the determined time;
   receiving a reply to the request to change the PTW, the reply including information about a new PTW for monitoring the set of PDCCH monitoring occasions, wherein the new PTW comprises an extension to the PTW;
   monitoring the set of PDCCH monitoring occasions according to the new PTW.

2. The method of claim 1, further comprising:
   receiving second paging configuration information from a third apparatus; and
   performing the process based on the first and second paging configuration information.

3. The method of claim 1, wherein the monitoring the set of PDCCH monitoring occasions according to the new PTW comprises:
   monitoring an incomplete PDCCH monitoring occasion; that is a PDCCH monitoring occasion that overlaps with the new PTW and that is not fully contained within the new PTW.

4. The method of claim 1,
   wherein the set of PDCCH monitoring occasions are associated with a paging occasion (PO) that overlaps with the new PTW and that is not fully contained within the new PTW, and the first apparatus is configured to perform least one of the following:
   monitor all the set of PDCCH monitoring occasions outside the new PTW that belong to the PO that overlaps with the PTW:
   monitor a preconfigured number of the set of PDCCH monitoring occasions outside the new PTW that belong to the PO that overlaps with the new PTW; or
   monitor the set of PDCCH monitoring occasions until a page is received within the PO or until the PO ends.

5. The method of claim 2, wherein the first paging configuration information or the second paging configuration information comprises information for PDCCH monitoring occasions of the set of PDCCH monitoring occasions that are specifically configured for at least one of the following parameters:
   a generic Reduced Capabilities (RedCap) device;
   a predetermined type of RedCap device; or
   a power characteristic.

6. The method of claim 1, wherein the request to change the PTW is triggered based on at least one of the following:
   a change of a traffic profile associated with the first apparatus;
   a change of a traffic profile associated with an radio resource control (RRC) state; or
   a change of a traffic profile associated with an emergency alert.

7. The method of claim 2, further comprising:
   reporting to the second apparatus or the third apparatus a change in traffic profile or in a change in a planned or predicted traffic profile, and
   in response to the reporting, receiving from the second apparatus or the third an update to the set of the PDCCH monitoring occasions.

8. The method of claim 2, further comprising:
   receiving from the second apparatus or third apparatus a modification to the first or second paging configuration information, based on a change of an available paging capacity of the network; and
   performing the process based on the modification to the first and second paging configuration information.

9. The method of claim 1, further comprising:
   periodically receiving, from the second apparatus the first paging configuration information in system information based on beam sweeping or synchronization signal block (SSB) burst patterns, the first paging configuration information including a paging timing window (PTW).

10. The method of claim 2, wherein the second paging configuration information includes the PTW, and the third apparatus determines the second paging configuration information based on assistance information comprised of beam sweeping and synchronization signal block (SSB) burst patterns obtained from the second apparatus.

11. The method of claim 2, wherein the first paging configuration information received by the first apparatus includes a common starting point for the PTW that is coordinated between the second apparatus and the third apparatus.

12. The method of claim 2, further comprising:
receiving from the second apparatus or the third apparatus, a PTW extension indication as at least a part of the information about the new PTW.

13. The method of claim 1, wherein the first apparatus is a user equipment.

14. The method of claim 1, wherein the second apparatus is a base station.

15. The method of claim 2, wherein the third apparatus is a core network apparatus.

16. A first apparatus comprising:
a processor; and
a memory coupled with the processor, the memory storing executable instructions that when executed by the processor cause the processor of the first apparatus to perform operations comprising:
receiving first paging configuration information from a second apparatus relative to a set of physical downlink control channel (PDCCH) monitoring occasions; and
based on the first paging configuration information, perform a process comprising:
determining a paging timing window (PTW) for monitoring the set of PDCCH monitoring occasions:
determining a time to send a request to change the PTW for monitoring the set of PDCCH monitoring occasions:
sending a request to change the PTW at the determined time:
receiving a reply to the request to change the PTW, the reply including information about a new PTW for monitoring the set of PDCCH monitoring occasions, wherein the new PTW comprises an extension to the PTW.

17. The first apparatus of claim 16, wherein the operations further comprise:
receiving second paging configuration information from a third apparatus; and
performing the process based on the first and second paging configuration information.

18. The first apparatus of claim 16, wherein the operations further comprise monitoring an incomplete PDCCH monitoring occasion that is a PDCCH monitoring occasion that overlaps with the new PTW and that is not fully contained within the new PTW.

19. The first apparatus of claim 16,
wherein the set of PDCCH monitoring occasions are associated with a paging occasion (PO) that overlaps with the new PTW and that is not fully contained within the new PTW, and the first apparatus is configured to perform at least one of the following:
monitor all the set of PDCCH monitoring occasions outside the new PTW that belong to the PO that overlaps with the new PTW;
monitor a preconfigured number of the set of PDCCH monitoring occasions outside the new PTW that belong to the PO that overlaps with the new PTW; or
monitor the set of PDCCH monitoring occasions until a page is received within the PO or until the PO ends.

20. The first apparatus of claim 17, wherein the first paging configuration information or the second paging configuration information comprises information for PDCCH monitoring occasions of the set of PDCCH monitoring occasions that are specifically configured for at least one of the following parameters:
a generic Reduced Capabilities (RedCap) device;
a predetermined type of RedCap device; or
a power characteristic.

* * * * *